United States Patent
Becker et al.

(10) Patent No.: US 11,664,544 B2
(45) Date of Patent: May 30, 2023

(54) BATTERY UNIT COMPRISING BUILT-IN TEMPERATURE CONTROL MEANS

(71) Applicant: SOGEFI AIR & COOLING, Guyancourt (FR)

(72) Inventors: Nicolas Becker, Porte du Ried (FR); Alexandre Floranc, Logelsheim (FR)

(73) Assignee: SOGEFI AIR & COOLING, Guyancourt (FR)

( * ) Notice: Subject to any disclaimer, the term of this patent is extended or adjusted under 35 U.S.C. 154(b) by 95 days.

(21) Appl. No.: 17/044,974

(22) PCT Filed: Apr. 8, 2019

(86) PCT No.: PCT/EP2019/058814
§ 371 (c)(1),
(2) Date: Oct. 2, 2020

(87) PCT Pub. No.: WO2019/197340
PCT Pub. Date: Oct. 17, 2019

(65) Prior Publication Data
US 2021/0167442 A1    Jun. 3, 2021

(30) Foreign Application Priority Data

Apr. 10, 2018 (FR) .................................. 18 53131
Jul. 4, 2018 (FR) .................................. 18 56167

(51) Int. Cl.
*H01M 4/02* (2006.01)
*H01M 10/6556* (2014.01)
(Continued)

(52) U.S. Cl.
CPC .......... *H01M 10/6556* (2015.04); *B60K 6/28* (2013.01); *B60L 50/64* (2019.02); *B60L 58/24* (2019.02);
(Continued)

(58) Field of Classification Search
CPC ..................................................... H01M 4/02
See application file for complete search history.

(56) References Cited

U.S. PATENT DOCUMENTS

| 2015/0236314 A1 | 8/2015 | Lee et al. |
| 2016/0172726 A1 | 6/2016 | Enning et al. |

FOREIGN PATENT DOCUMENTS

| CN | 105762438 A |   | 7/2016 |
| DE | 102012012663 | * | 12/2013 |

(Continued)

OTHER PUBLICATIONS

International Search Report dated Apr. 30, 2019.
Search Report dated Mar. 23, 2020.
Indian Examination Procedure dated May 25, 2022.

*Primary Examiner* — Jacob B Marks
(74) *Attorney, Agent, or Firm* — Ipsilon USA, LLP

(57) ABSTRACT

The invention relates to a battery unit (1) essentially comprising a plurality of cells, a housing (3) receiving and surrounding said cells, and means (5) for regulating the temperature of said cells by circulation of a heat-transfer fluid. Said battery unit (1) is characterised in that the housing (3) comprises, at least in a bottom region on which the cells are arranged, at least one, preferentially several, heat exchange zones for heat exchange between said cells and the heat-transfer fluid, said at least one zone being built into the structure of said housing (3), preferentially in the wall thereof.

25 Claims, 21 Drawing Sheets

(51) Int. Cl.

| | |
|---|---|
| *H01M 10/613* | (2014.01) |
| *H01M 10/625* | (2014.01) |
| *H01M 10/647* | (2014.01) |
| *H01M 10/6567* | (2014.01) |
| *B60L 50/64* | (2019.01) |
| *B60L 58/24* | (2019.01) |
| *B60K 6/28* | (2007.10) |
| *F28F 3/12* | (2006.01) |
| *F28F 9/02* | (2006.01) |
| *H01M 10/653* | (2014.01) |
| *H01M 50/262* | (2021.01) |
| *H01M 50/278* | (2021.01) |
| *H01M 50/227* | (2021.01) |
| *H01M 50/204* | (2021.01) |

(52) U.S. Cl.
CPC .............. *F28F 3/12* (2013.01); *F28F 9/0246* (2013.01); *H01M 10/613* (2015.04); *H01M 10/625* (2015.04); *H01M 10/647* (2015.04); *H01M 10/653* (2015.04); *H01M 10/6567* (2015.04); *H01M 50/204* (2021.01); *H01M 50/227* (2021.01); *H01M 50/262* (2021.01); *H01M 50/278* (2021.01); *B60Y 2200/91* (2013.01); *B60Y 2200/92* (2013.01); *B60Y 2400/112* (2013.01); *H01M 2220/20* (2013.01)

(56) References Cited

FOREIGN PATENT DOCUMENTS

| DE | 10 2013 011895 | 1/2015 |
|---|---|---|
| JP | WO2011092773 | 5/2013 |

\* cited by examiner

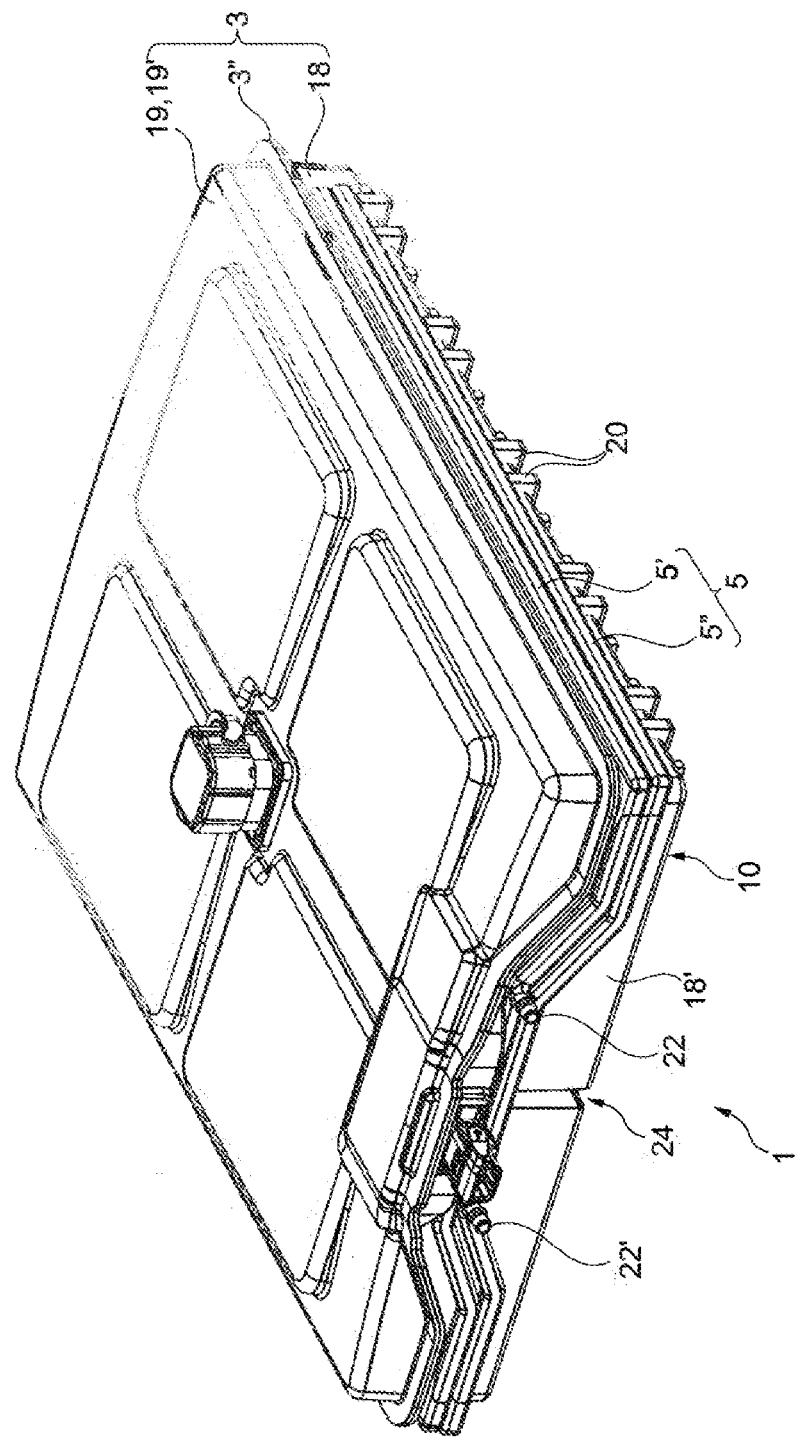

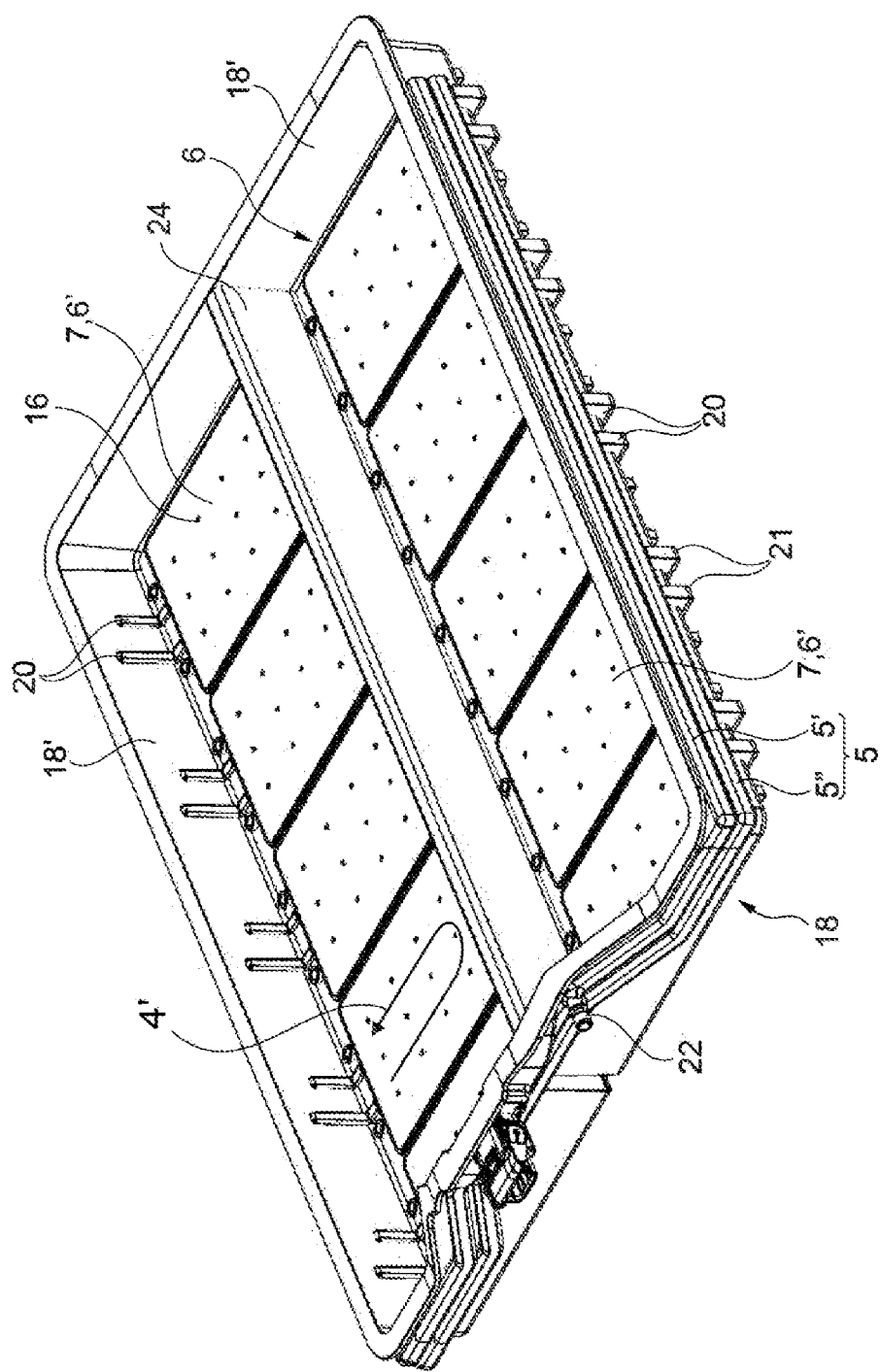

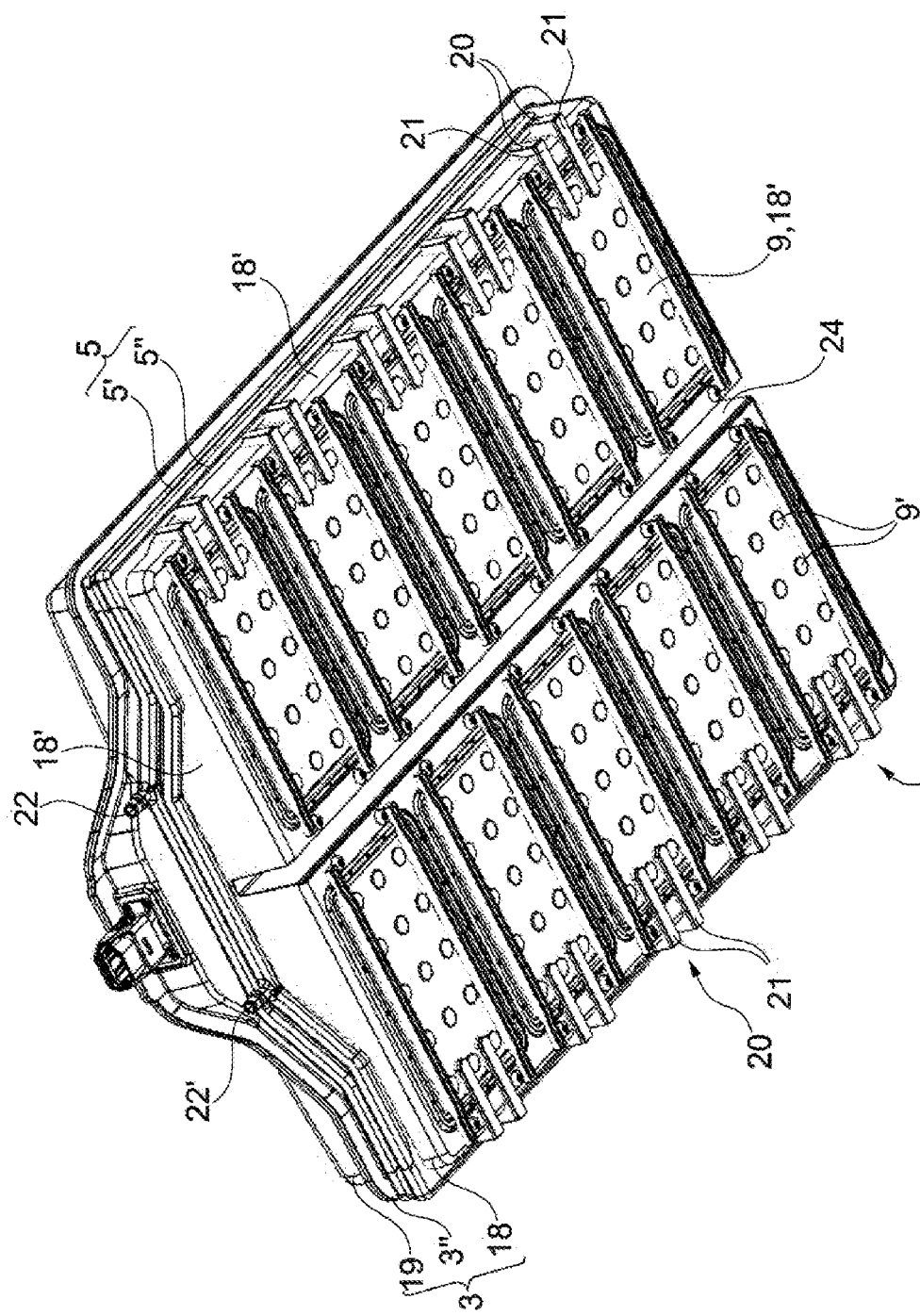

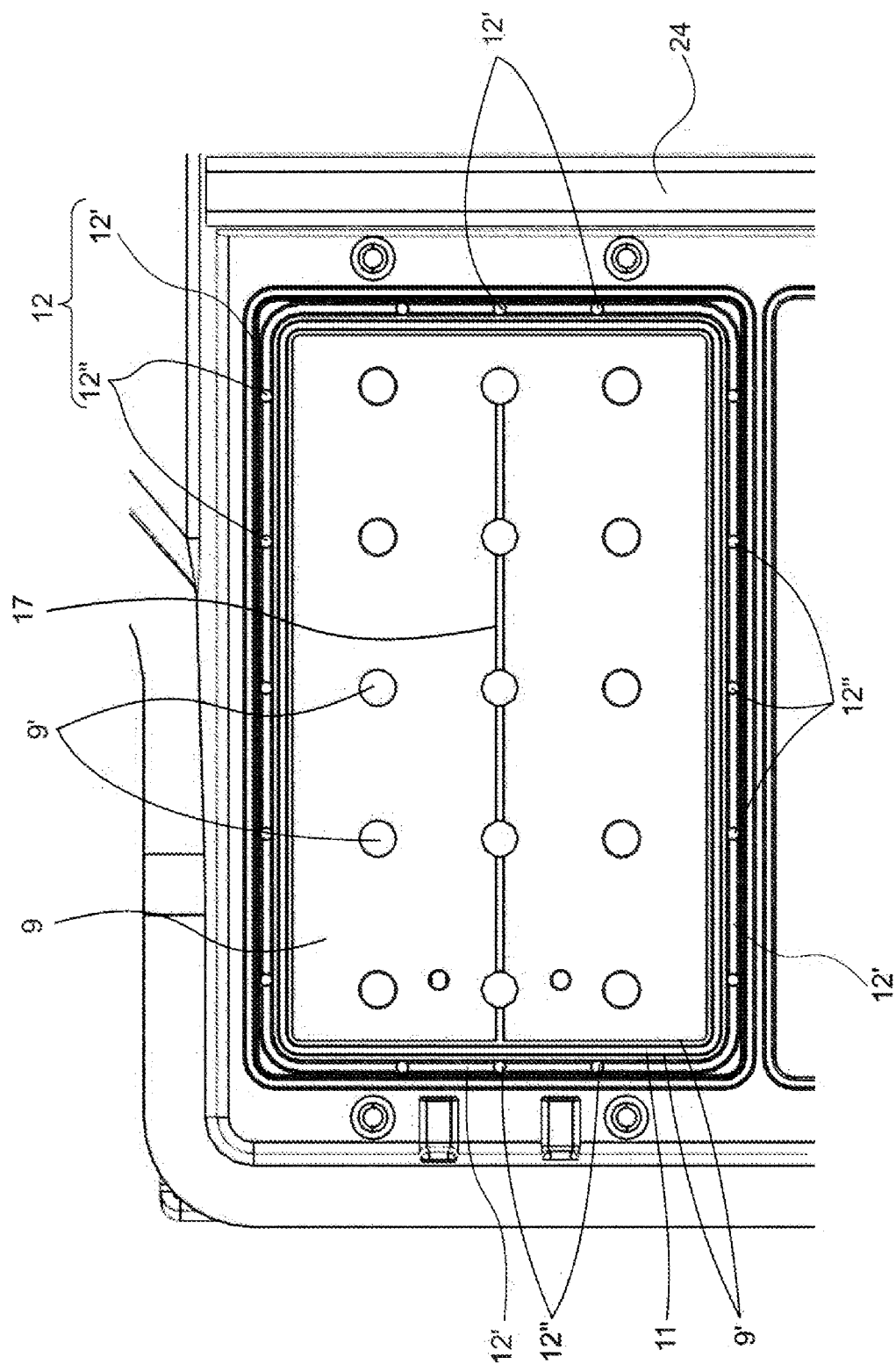

BATTERY UNIT COMPRISING BUILT-IN TEMPERATURE CONTROL MEANS

RELATED APPLICATIONS

This application is a National Phase of PCT/EP2019/058814 filed on Apr. 8, 2019 which claims the benefit of priority from French Patent Application Nos. FR 18 53131 filed on Apr. 10, 2018 and FR 18 56167 filed on Jul. 4, 2018, the entirety of which are incorporated by reference.

BACKGROUND

Field of the Invention

The present invention relates to the field of autonomous electrical energy sources, in particular those embedded in motor vehicles, and its subject is a battery unit with incorporated temperature control or regulation means and a hybrid or electric motor vehicle comprising at least one such unit.

Description of the Related Art

Hybrid/electric vehicles are equipped with a battery that makes it possible to store the electrical energy necessary for their operation. The current issues require the design of the battery units, also called "battery packs", to be optimized in order to obtain the best performance levels in terms of life span (charge/discharge) and operating range. The charging time is also an important factor in the daily use of these battery packs.

The batteries implemented ideally need to operate at temperatures between 10° C. and 30° C., in particular the high-density storage batteries, of the Li-ion or Li-polymer type, for example. An excessively low temperature affects the range and an excessively high temperature affects the life span of the batteries. It is therefore necessary to regulate the temperature of the batteries to the best possible extent.

In the context of vehicle-embedded applications, there are air-cooled battery solutions, but the heat exchange remains fairly limited. The current trend is to use a heat-transfer fluid in order to enhance the heat exchanges and increase the regulation efficiency.

Furthermore, the housings receiving these batteries can be formed directly by a part of the vehicle or consist of cavities formed in a structural part of said vehicle. However, these solutions are highly inflexible in terms of location and make maintenance difficult. The solutions involving battery packs that are autonomous and not incorporated in the structure of the vehicle are therefore to be preferred.

There are numerous designs in the state of the art: they use metallic solutions (steel, aluminum, etc.) with a distribution of heat-transfer fluid by hoses to cooling plates assembled and arranged inside the battery pack, on which the modules combining the cells or elements of the battery are arranged.

The result thereof is a complex construction, formed by the assembly of a significant number of parts, requiring many tight connections to be made during production (the aging resistance of which can be problematic) and forming a structure that is bulky and that has many components.

Furthermore, since the housing of the battery units of these known solutions is metal (preferentially of aluminum), it cannot outwardly thermally and electrically insulate the battery pack, it also has a high cost price and is, furthermore, subject to corrosion.

Furthermore, no effective provision is made in these known solutions to preserve the battery in case of leakage of heat-transfer liquid inside the housing.

OBJECTS AND SUMMARY

The aim of the present invention is to overcome at least the abovementioned main limitations.

To this end, the subject of the invention is a battery unit, notably for a hybrid and/or electric motor vehicle, essentially comprising, on the one hand, a plurality of battery cells or elements, if necessary grouped together physically and/or electrically in several blocks or modules, on the other hand, a housing accommodating and surrounding said cells or elements and, finally, means for regulating the temperature of said cells or elements by circulation of heat-transfer fluid, said battery unit being characterized in that the housing comprises, at least in a bottom region on which the cells are arranged, at least one, preferentially several, heat exchange zones between said cells and the heat-transfer fluid, said zone or zones being incorporated in the structure of said housing, preferentially in the wall thereof, and in that the or each exchange zone comprises a surface element with high thermal conductivity in contact with cells, on the one hand, and the heat-transfer fluid, on the other hand, and, in that the surface element with high thermal conductivity is an element added in the housing, and consists of a metal plate, or of a similar material that is rigid and a good thermal conductor, fluid-tightly secured with a surface element with low thermal conductivity, each surface element with low thermal conductivity of the or each exchange zone forming an integral part of the housing and advantageously forming a portion of the wall thereof.

BRIEF DESCRIPTION OF THE DRAWINGS

The invention will be better understood from the following description, which relates to preferred embodiments given as nonlimiting examples and explained with reference to the attached schematic drawings, in which:

FIGS. 1A and 1B are perspective views from two different angles of a battery unit according to the invention, with a rectangular parallelepipedal housing formed by the assembly of a bottom tray and a cover;

FIG. 7A is a view similar to that of FIG. 2, the battery cells or elements being removed and only the bottom tray being represented;

FIG. 8 is a perspective view from below of the bottom tray of a battery unit represented in FIGS. 1A and 1B;

FIG. 12B is a view from above of the object represented in FIG. 12A;

DETAILED DESCRIPTION

Figure 1B:
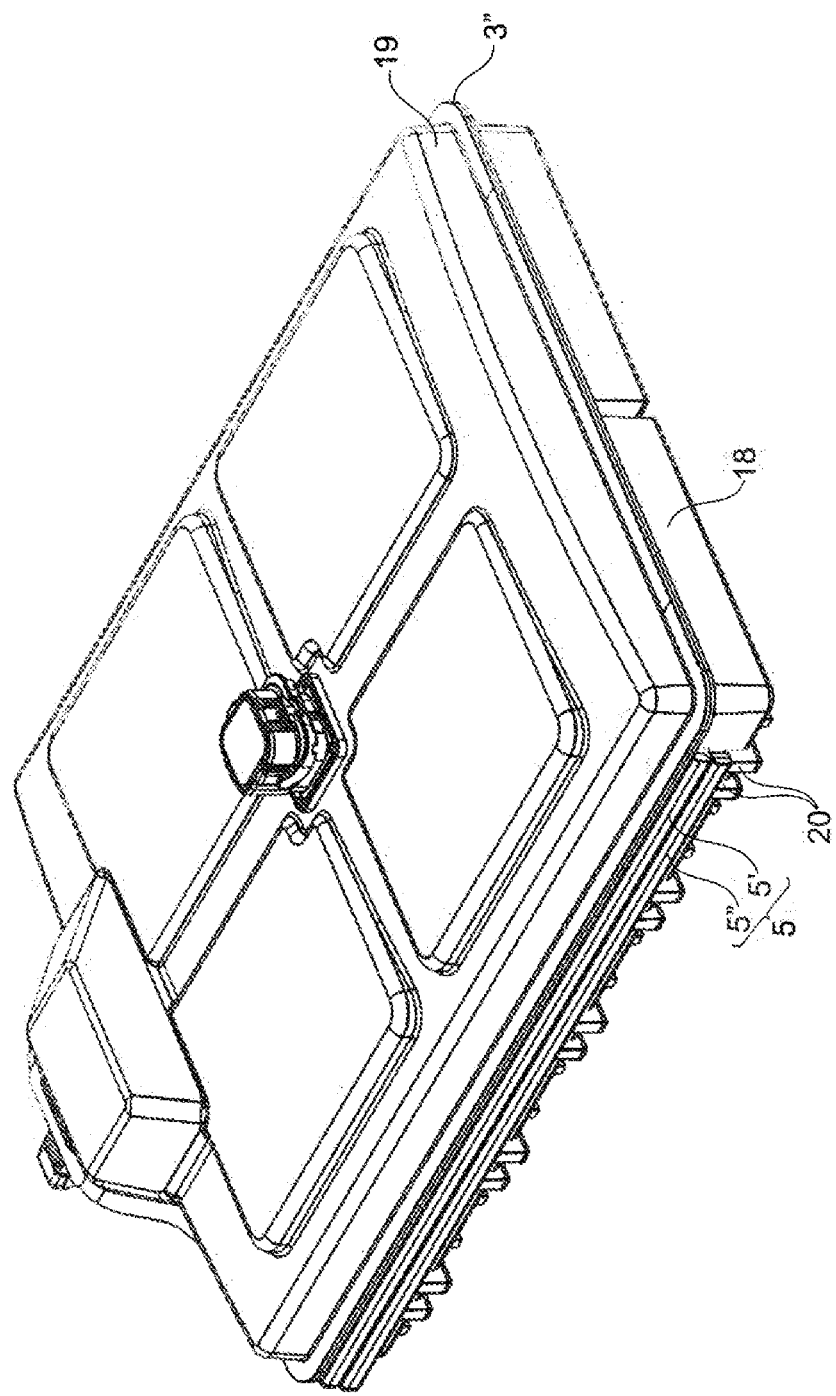
Figure 2:
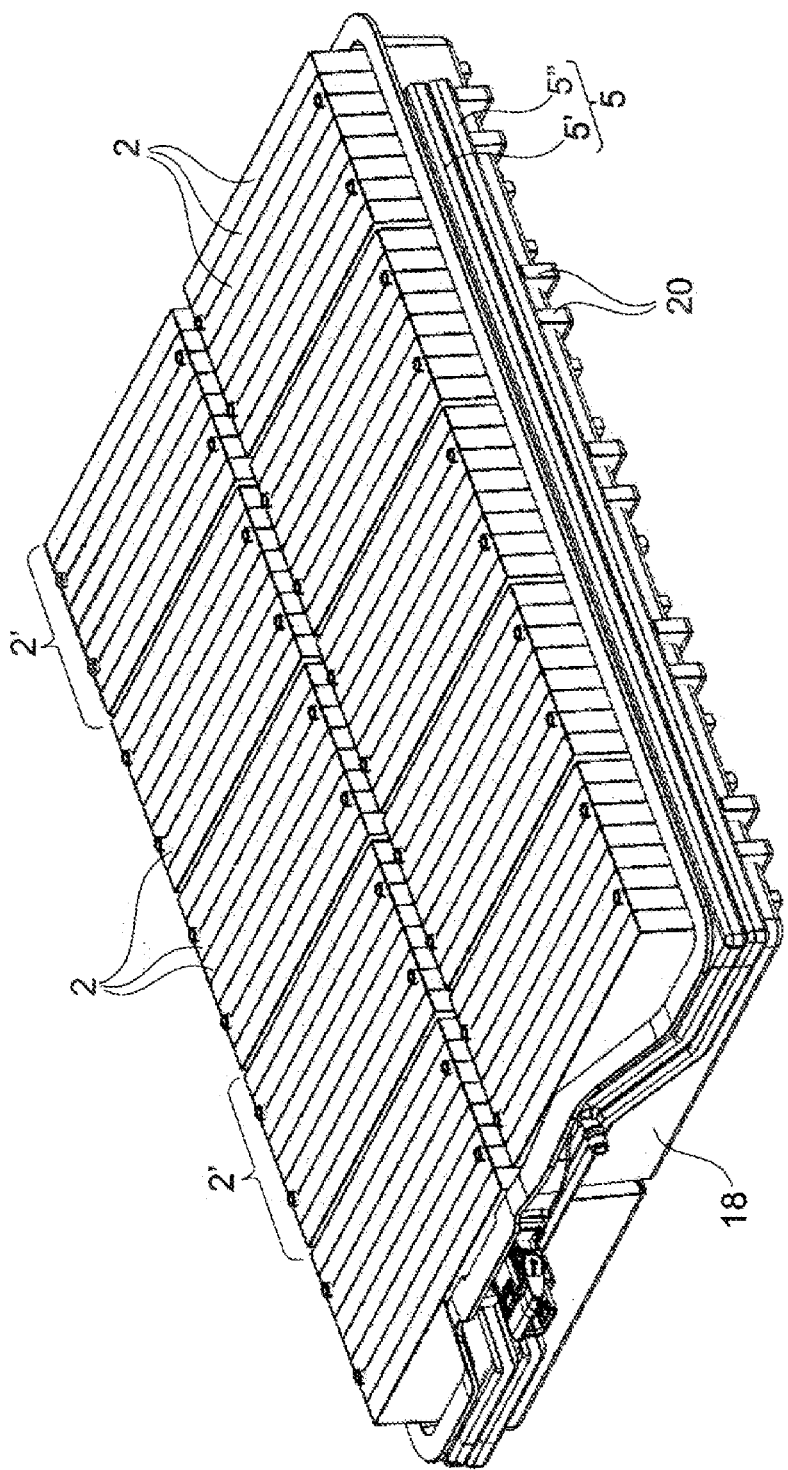
FIG. 2 is a perspective view similar to that of FIG. 1A, the cover being removed.

FIGS. 1, 3, 7, 14, 15, 17 and 18 in particular show a battery unit 1, notably for a hybrid and/or electric motor vehicle, essentially comprising, on the one hand, a plurality of battery cells 2 or elements, if necessary grouped together physically and/or electrically in several blocks or modules 2', on the other hand, a housing 3 accommodating and surrounding said cells or elements 2 and, finally, means 4, 5 for regulating the temperature of said cells or elements 2 by circulation of heat-transfer fluid FC.

In accordance with the invention, the housing 3 comprises, at least in a bottom region 6 on which the cells 2 are arranged, at least one, preferentially several, heat exchange zones 6' between said cells 2 and the heat-transfer fluid FC, said zone or zones 6' being incorporated in the structure of said housing 3, preferentially in the wall 3' thereof.

Also in accordance with the invention, the or each exchange zone 6' comprises a surface element 7 with high thermal conductivity in contact with cells 2, on the one hand, and the heat-transfer fluid FC, on the other hand.

Furthermore, the surface element 7 with high thermal conductivity is an element added in the housing 3, and consists of a metal plate, or of a similar material that is rigid and a good thermal conductor, fluid-tightly secured with a surface element 9 with low thermal conductivity, each surface element 9 with low thermal conductivity of the or each exchange zone 6' forming an integral part of the housing 3 and advantageously forming a portion of the wall 3', 10, 11' thereof.

Thus, because of the incorporation of at least a part of the temperature regulation means 4, 5 (here at least the heat exchange zones 6') in the very structure of the housing 3, a compact construction is obtained (maximum internal volume, minimum external volume), with a limited number of pieces and of parts to be assembled (only the constituent parts 10, 11 of the housing 3 must be mutually secured, the heat exchange zone or zones 6' being incorporated in said parts of housing 3).

Preferentially, a surface element 7 is associated with the cells 2 of a single module 2' (the modular arrangements of the zones 6' and of the modules 2' coinciding and corresponding).

The heat exchange zones 6' can thus form means for regulating the temperature of the cells 2 which not only are incorporated in the very structure of the housing 3, but can also be organized and segmented according to the organization and the possible grouping-together of the cells 2 (in modules 2'), for an optimized heat transfer efficiency.

In accordance with an advantageous constructive characteristic of the invention, emerging notably from FIGS. 4 to 13 and 17, the or each exchange zone 6' comprises a volume 8 for circulation of heat-transfer fluid FC, defined between a surface element 7 with high thermal conductivity, in direct contact with cells 2, and a surface element 9 with low thermal conductivity, in contact with the outside environment.

Thus, the heat exchange with the fluid FC of the volume 8 is extremely favored at the surface element 7 and, on the contrary, reduced to the maximum at the complementary surface element 9.

A high thermal conductivity, and more generally a good heat transfer between the fluid FC and the cells 2, is achieved by using a material that is intrinsically a good heat conductor (metal plate) and used in small thickness, in connection with a maximum contact surface area and an optimized contact quality between the surface element 7 and the cells 2, if necessary of the module 2' concerned.

The low thermal conductivity, for its part, can be achieved by using a material that is a weak thermal conductor, even thermally insulating, in combination with a relatively great thickness of the wall of the surface element 9.

Typically, high thermal conductivity $\lambda$ is understood herein to mean values of $\lambda$ such that $\lambda > 50$ W·m$^{-1}$·K$^{-1}$, preferentially $\lambda > 100$ W·m$^{-1}$·K$^{-1}$, and low thermal conductivity $\lambda$ is understood herein to mean values of $\lambda$ such that $\lambda < 1$ W·m$^{-1}$·K$^{-1}$, preferentially $\lambda < 0.5$ W·m$^{-1}$·K$^{-1}$.

Advantageously, the material with good thermal conductivity has a conductivity between 100 W/m/K and 300 W/m/K, typically 200 W/m/K such as aluminum. Correlatively, the material with low thermal conductivity has a conductivity between 0.05 W/m/K and 0.5 W/m/K, typically 0.2 W/m/K such as plastic of PP GF30 type.

In the context of the present invention, the greater the difference in thermal conductivity between the element 7 (with high thermal conductivity—for example plate made of metal material of small thickness) and the element 9 (with low thermal conductivity—for example wall made of plastic material of great thickness) the greater the beneficial effect of the invention.

As stated above, the material of the surface element 7, preferentially aluminum, can also be non-metallic, and for example consist of a thermoplastic or thermoset material, filled with additive to increase its thermal conductivity.

The surface element 7 can, as a variant, also be of supple or flexible nature to adapt to and make up for defects of flatness of the modules 2', while being a good thermal conductor (element 7 made of silicone for example, preferentially filled).

The or each thermally conductive plate 7, in addition to an optimized heat exchange with the cells 2 (possibly only of the module 2' which is assigned to it), will have to tightly delimit an elementary volume 8 for circulation of fluid FC in connection with a surface element 9, and withstand the deformations induced by the temperature variations, in order to permanently maintain an optimal surface contact with the cells 2. Its securing and assembly with the housing 3 and with the paired surface element 9 are therefore advantageously both peripheral and, at least on an ad hoc basis, distributed over its surface.

Figure 6:
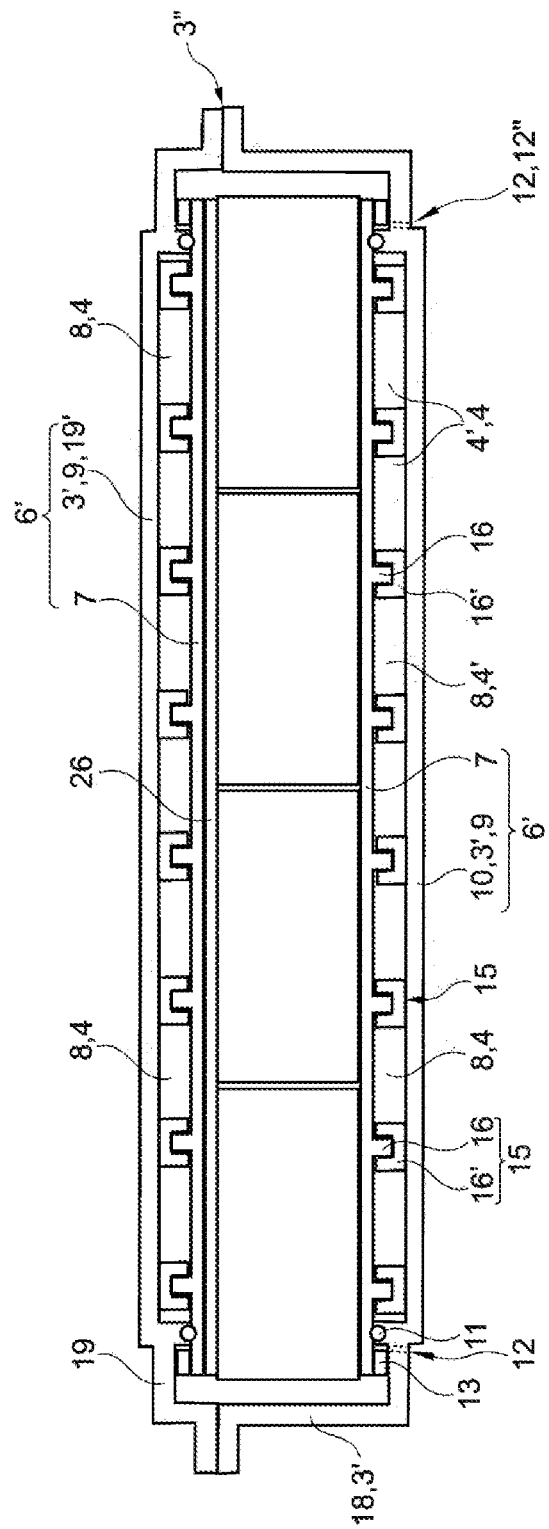
FIG. 6 is a schematic cross-sectional view of a battery unit according to another embodiment of the battery unit of the invention.

The housing 3 can comprise only a single heat exchange zone 6' (only in the bottom tray 18) or a single heat exchange zone 6' in each of its constituent parts (for example one zone 6' in the bottom tray 18 and one zone 6' in the cover 19—FIG. 6).

However, preferably, the housing 3 comprises a plurality of heat exchange zones 6' in one, several or each of its constituent parts (tray 18, cover 19), each zone 6' being advantageously assigned to a module 2' (see FIGS. 3, 4, 8, 9, 11 and 16).

Thus, the surface elements 7 and 9 constitute, by cooperation, regions of wall 3' with double-wall structure of the housing 3, these regions of wall with double skin corresponding to the heat exchange zones 6' and enclosing the incorporated volumes 8 for circulation of heat-transfer fluid FC.

In accordance with an important feature of the invention, emerging from FIGS. 4 to 6, 9, 10, 12 and 13, the or each circulation volume 8 is delimited laterally or peripherally by a sealing means 11 arranged between the two elements 7 and 9 considered, a leak path 12 being formed around the surface element 9 concerned, allowing the outward discharge of any heat-transfer liquid FC leaking if necessary from the volume 8 targeted.

Such an embodiment makes it possible, simply, to form tight circulation volumes 8 while guaranteeing, in case of damage or accidental breakage or due to aging, any absence of contact between the heat-transfer liquid FC and the cells 2. The different leak paths 12 associated with the different zones 6' can possibly be fluidically linked to one another to produce a flow of heat-transfer fluid leaking from a volume 8 or from several volumes 8 to one or more discharge orifices situated at particular locations of the bottom wall 10 (low points).

Provision can also be made to arrange sensors or leak detectors in the different leak paths 12, or alternatively, a single leak detector in case of convergence of the different leak paths 12 (not represented).

Thus, the invention can provide for at least some, or all, of the leak paths 12 of the different heat exchange zones 6' to converge toward a zone or a single point of the bottom wall 10 of the housing 3, provided with a discharge orifice 12", and, possibly, the zone or the point of convergence of the flows originating from several, or from all, the leak paths 12 is equipped with a detector of the presence of heat-transfer liquid FC.

However, advantageously, each leak path 12 associated with a heat exchange zone 6' is independent of the other leak paths and comprises its own outward discharge means (through orifices 12").

Advantageously, in connection with a simple and economical constructive embodiment, the or each leak path 12 is formed in the bottom wall 10 of the housing 3 and extends continually around the peripheral sealing means 11 of the circulation volume 8 concerned, which corresponds preferentially to a flat and planar chamber. Thus, regardless of the location of a possible leak, the heat-transfer liquid will be recovered by said path 12 and routed to the outside (underside of the bottom tray 18).

In accordance with a preferred practical embodiment, the or each leak path 12 comprises a groove or score 12' formed in the bottom wall 10 and which extends outward and circumferentially around the peripheral sealing means 11 of the circulation volume 8 considered, by advantageously closely following the outline of said means 11. At least one, advantageously two and preferentially several, orifices 12" passing through the bottom wall 10 of the housing is/are formed in the bottom of said groove 12'. Regardless of whether the unit 1 is or is not inclined with respect to the horizontal, a rapid outward discharge of the liquid FC having leaked from the volume 8 concerned is consequently ensured. By advantageously providing at least two orifices 12", a venting function can be provided.

According to an advantageous constructive feature, emerging for example from FIGS. 4 to 6 and 13, each surface element 7 with high thermal conductivity and in the form of a plate comprises an edge forming a peripheral frame 13, in a single piece or added by overmolding, secured with the bottom wall 10 of the housing 3, the portion of bottom wall 10 facing the surface element 7 forming a surface element 9 with low thermal conductivity and the securing zone 14 between the frame 13 and the bottom wall 10, for example a weld bonding zone, extending around and at a distance from the peripheral sealing means 11 of the circulation volume 8 concerned.

Also preferentially, the leak path 12 of each exchange zone (6') extends between the securing zone 14 and the peripheral sealing means 11.

The surface element 7 of each exchange zone 6' is thus extended peripherally beyond the continuous sealing means 11 and has an edge 13 designed and/or overmolded (for example folded and provided with a bead of overmolded material forming a second tight barrier and delimiting, with the overlapping part of the element 7, the groove 12' and the edges 9''' of the surface element 9, a leak path 12 to the outside (the latter then takes the form of a duct with orifices 12" emerging on the outside). The orifices 12" can typically have diameters of between 3 and 6 mm, preferentially of the order of 4 to 5 mm.

Such a frame 13 notably makes it possible to establish a continuous bond over the perimeter, preferentially by laser welding.

As an example, the sealing means 11 can consist of a seal 14 that is present, in the compressed state, between the mutually secured peripheral edges of the two surface elements 7 and 9, this seal 14 being preferentially housed in a groove 11' of the bottom wall 10.

In connection notably with an embodiment of the bottom tray 18 produced by injection molding, provision can be made for each surface element 9 to correspond to a depressed zone or a depression of the bottom wall 10 of the housing 3, delimited laterally by raised edges 9''' on which a surface element 7 in the form of a thermally conductive plate is substantially arranged, with the interposition and/or compression of a sealing means 11.

Advantageously, and as for example FIGS. 10 to 12, 16 to 17 show, the circulation volumes 8 of the heat exchange zone or the different heat exchange zones 6' form portions of one or more circuits 4 for circulation of heat-transfer fluid FC, incorporated in the structure of the housing 3, said portions of circuit 4 being fluidically linked in series, or not, and connected to distribution/collection ducts 5', 5" forming part of a circuit 5 for supplying/discharging heat-transfer fluid liquid FC, these circuits 4 and 5 constituting the means for regulating the temperature of the cells 2.

In accordance with a preferred constructive variant of the invention, emerging notably from FIGS. 1, 3, 7, 14, 15 and 17, the housing 3 is made of plastic, and it is composed, on the one hand, of a bottom tray 18, with a bottom wall 10 (and lateral walls 18"), and of a top cover 19, this tray 18 and this cover 19 being assembled peripherally, preferentially by screwing, and possibly with the interposition of a seal, in a contact strip 3".

An embodiment of the housing 3 made of a rigid plastic material (thermoplastic material filled or not with additives and/or fibers, for example polypropylene, polyamide, polyester, etc.) and in two parts 18 and 19 assembled peripherally, makes it possible to simultaneously obtain (with respect to metal housings) better thermal insulation and a reduction of the cost prices, and allows for a wide variety and diversity of producible forms.

The tight assembly zone of the tray 18 with the cover 19 (if necessary made of a single piece or monobloc) can consist of a continuous peripheral contact strip 3" obtained by pressurized application of the respective edges of the tray and of the cover, or possibly by melting material between the facing edges with complementary configurations of the two constituent parts 18 and 19 of the housing 3.

A removable assembly by screwing, clipping or the like will be preferred because it allows for the cover 19 to be removed for test and maintenance operations and for the replacement of cell(s) 2 or of module(s) 2'.

Furthermore, a compression seal is, as is known, inserted between the two edges in contact in the assembly zone 3".

As indicated previously, provision is made for the bottom tray 18 to have formations or depressions in its bottom wall 10, and possibly in at least some of its lateral walls 18', these formations or depressions each forming a surface element 9 with low thermal conductivity and forming, each in cooperation with a surface element 7 with high thermal conductivity, in the form of a plate and in contact with cells 2, for example all the cells 2 of a module 2', heat exchange zones 6' each with a volume 8 for circulation of heat-transfer fluid FC.

This tray 18 can also, as a variant and as FIG. 6 shows, have only a single plate 7 and a single zone 6' in its bottom region 6.

Figure 3:
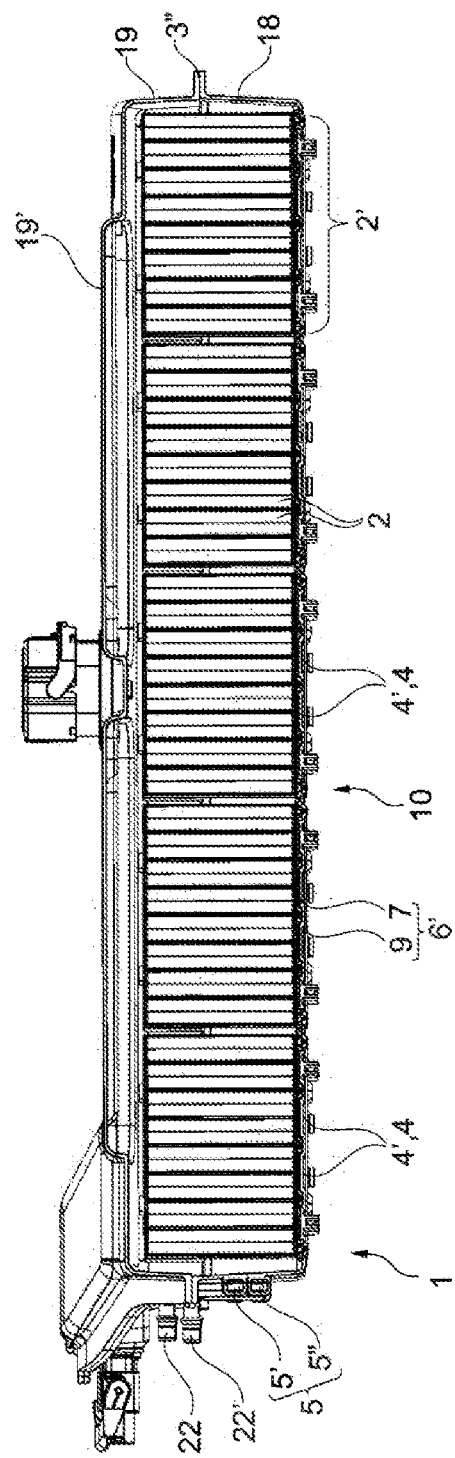
FIG. 3 is a total cross-sectional view of the battery unit represented in FIGS. 1 and 2.

In order to increase the cell regulation possibilities, by increasing the heat exchange interfaces and the available heating/cooling power, provision can be made for the cover 19 to also incorporate, in its structure, one or more heat exchange zones 6' between at least some, preferably all, of the cells 2 and the heat-transfer fluid FC. The or each heat exchange zone 6' of the cover 19 can comprise a volume 8 for circulation of heat-transfer fluid FC and be formed by the cooperation of a formation or depression of the wall 19' of the cover 19, forming a surface element 9 with low thermal conductivity, with a surface element 7 with high thermal conductivity, in the form of a plate and in contact with cells 2, for example all the cells 2 of a module 2' (FIGS. 3 and 6). The double-wall construction of the cover 19 can thus be similar to that of the tray 18.

In order to be able to compensate for the probable assembly plays of the different parts 18, 19 of the housing 3 so as not to compromise the heat-transfer efficiency between the cells 2 and the heat-transfer fluid FC, in particular on the cover 19, a flexible and thermally conductive plate or leaf 26 is inserted between the surface element or elements 7 with high thermal conductivity of the heat exchange zone or zones 6' incorporated in the cover 19, in the bottom 6' of the tray 6 and/or in the lateral walls 18' of the tray 18, on the one hand, and the faces concerned of the cells 2 of the modules 2' opposite, on the other hand.

If necessary, as a variant, each surface element 7 in the form of a plate can be coated with an individual layer of material with high thermal conductivity, such as, for example, filled silicone.

Figure 11:
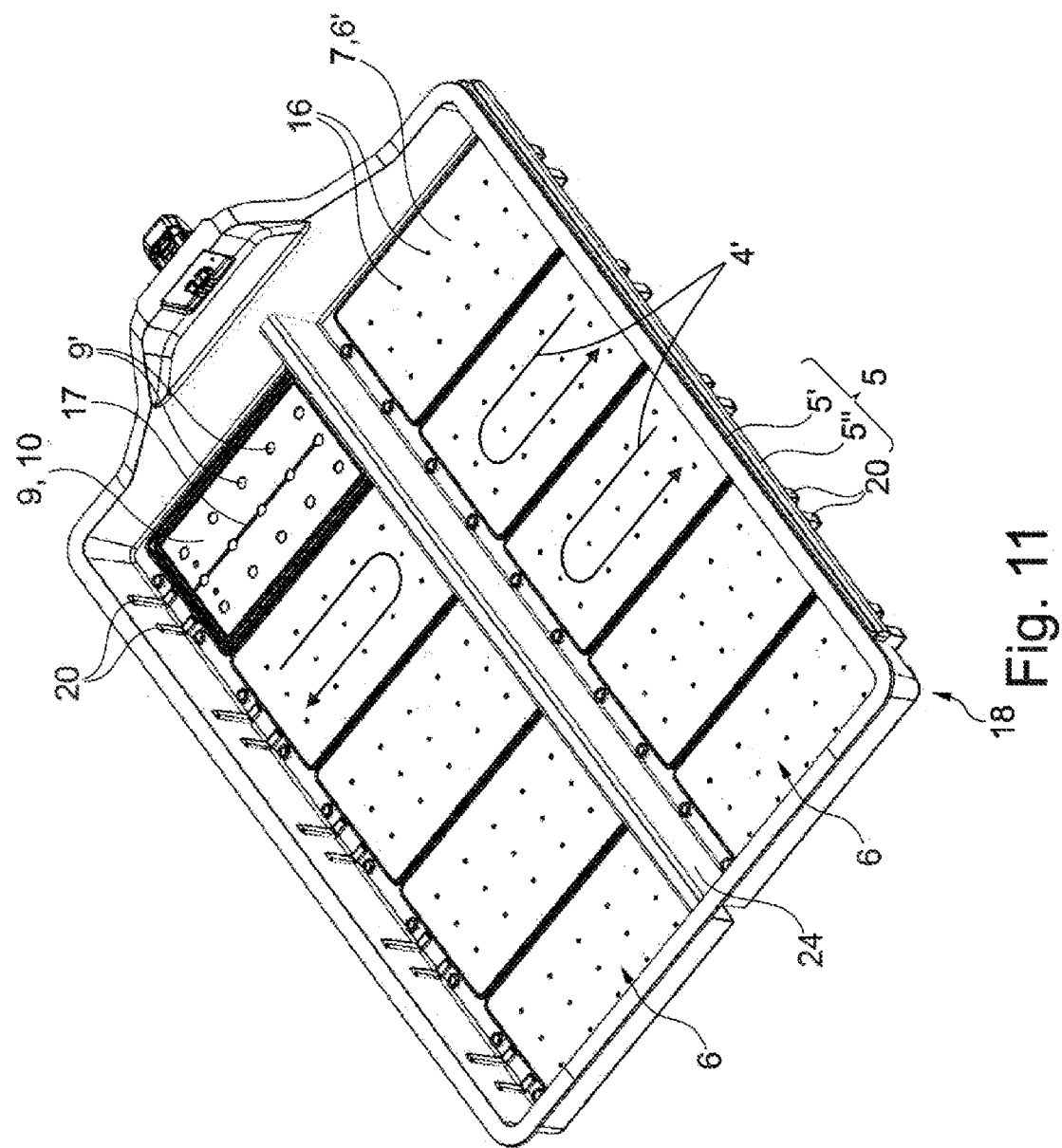
FIG. 11 is a view similar to that of FIG. 8 after the removal of a thermally conductive plate or a plate with high thermal conductivity of a heat exchange zone incorporated in the bottom tray.
Figure 12A:
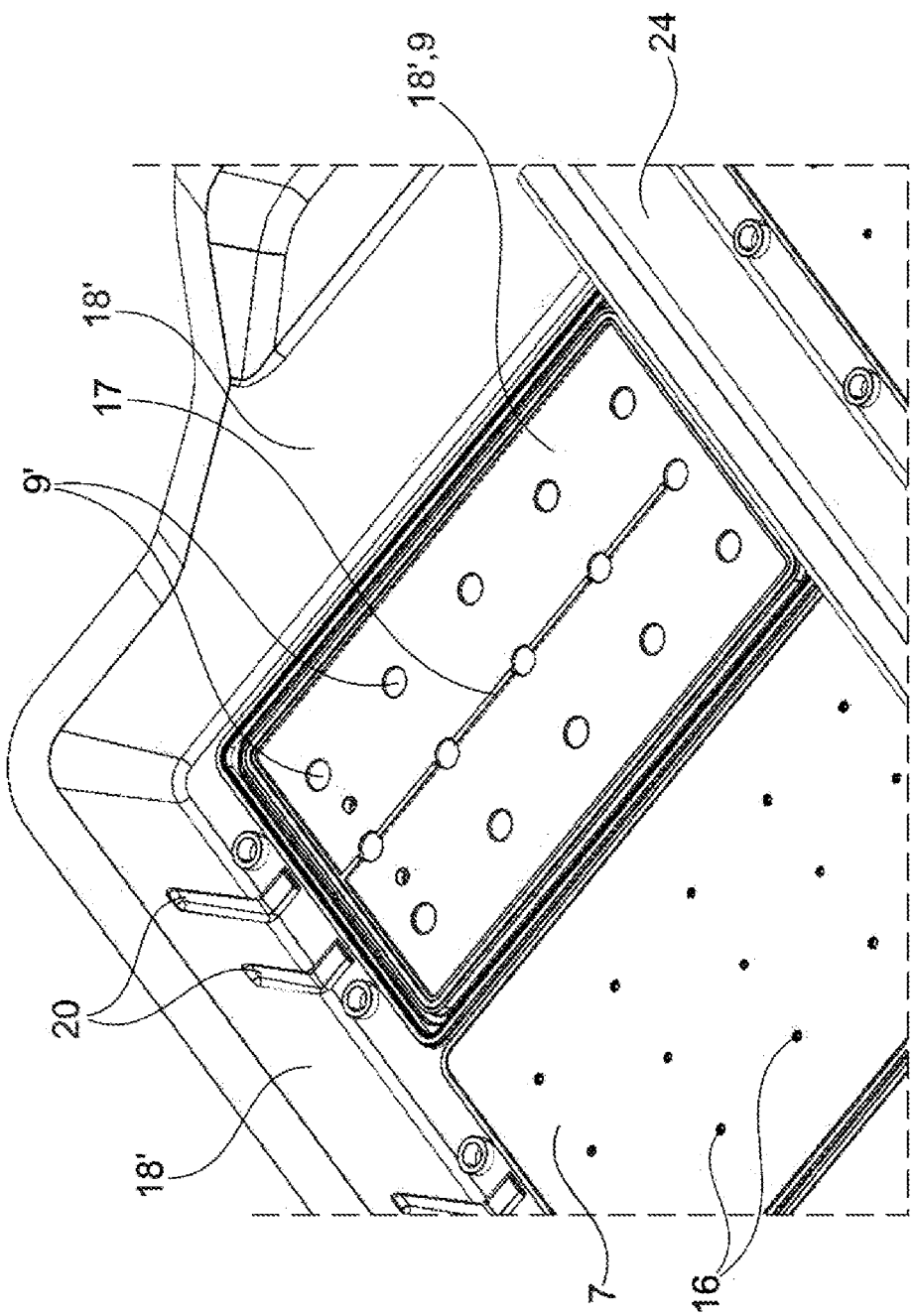
FIG. 12A is a view of a detail (portion of the bottom wall with depression of the heat exchange zone from which the conductive plate has been removed) of FIG. 11, to a different scale.
Figure 13:
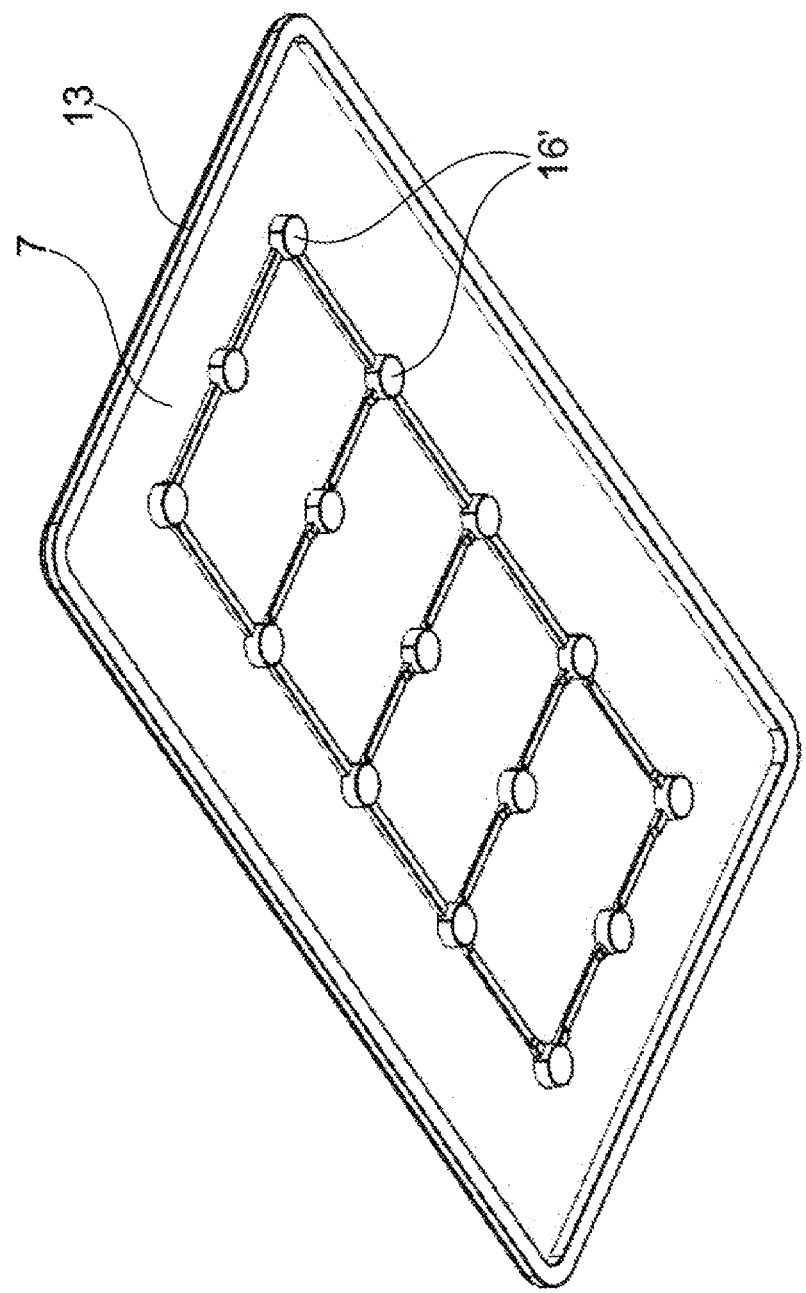
FIG. 13 is a perspective view from below of a plate with high thermal conductivity of a heat exchange zone.
Figure 14:
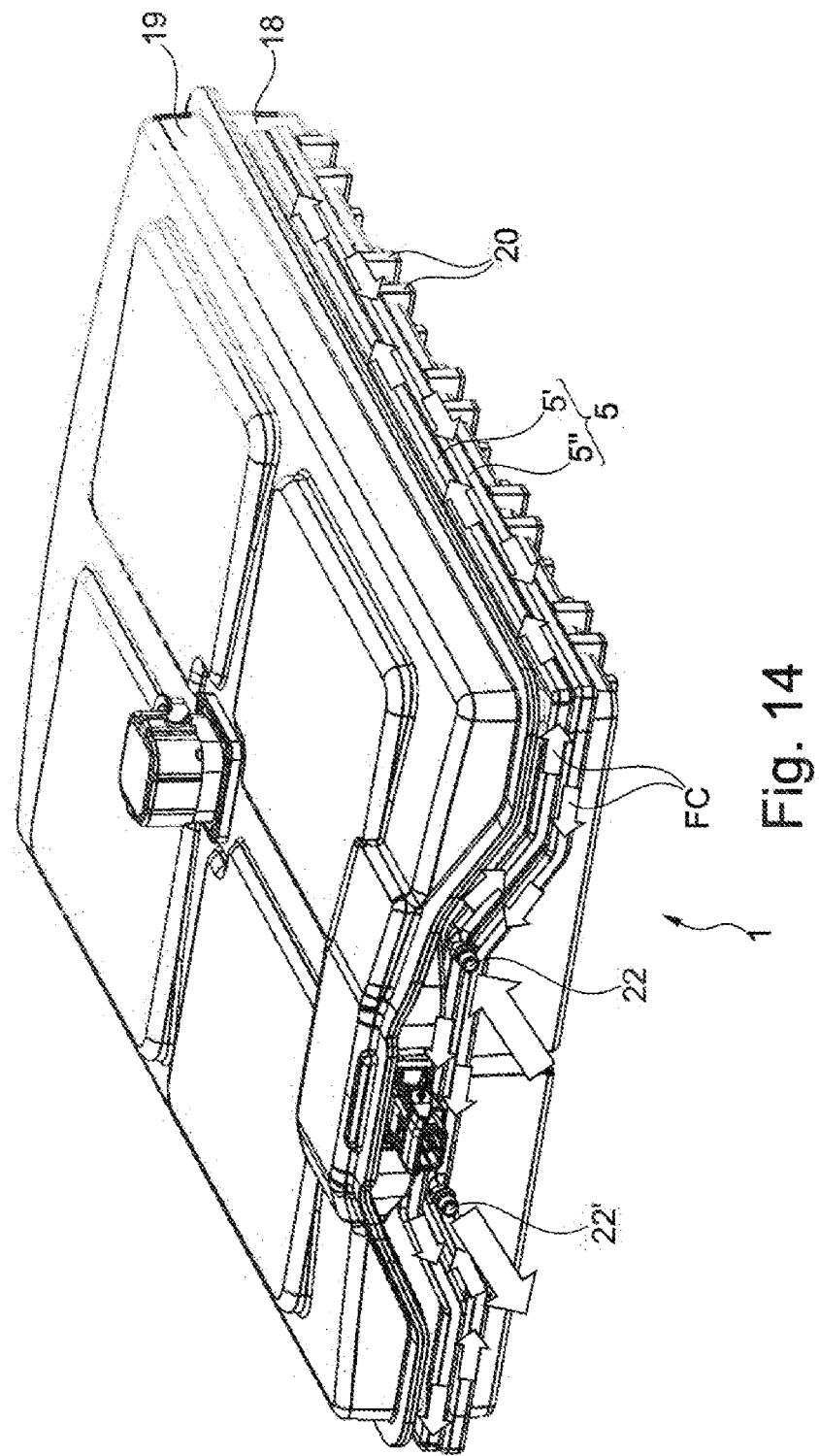
FIGS. 14 to 16 are views respectively identical to FIGS. 1A, 1B and 1C illustrating the circulation of the heat-transfer fluid in the supply and discharge ducts (FIGS. 14 and 15), in the tapping lines (FIG. 15) and in the internal volume of a heat exchange zone forming a portion of U-shaped elementary circuit (FIG. 16)
Figure 15:
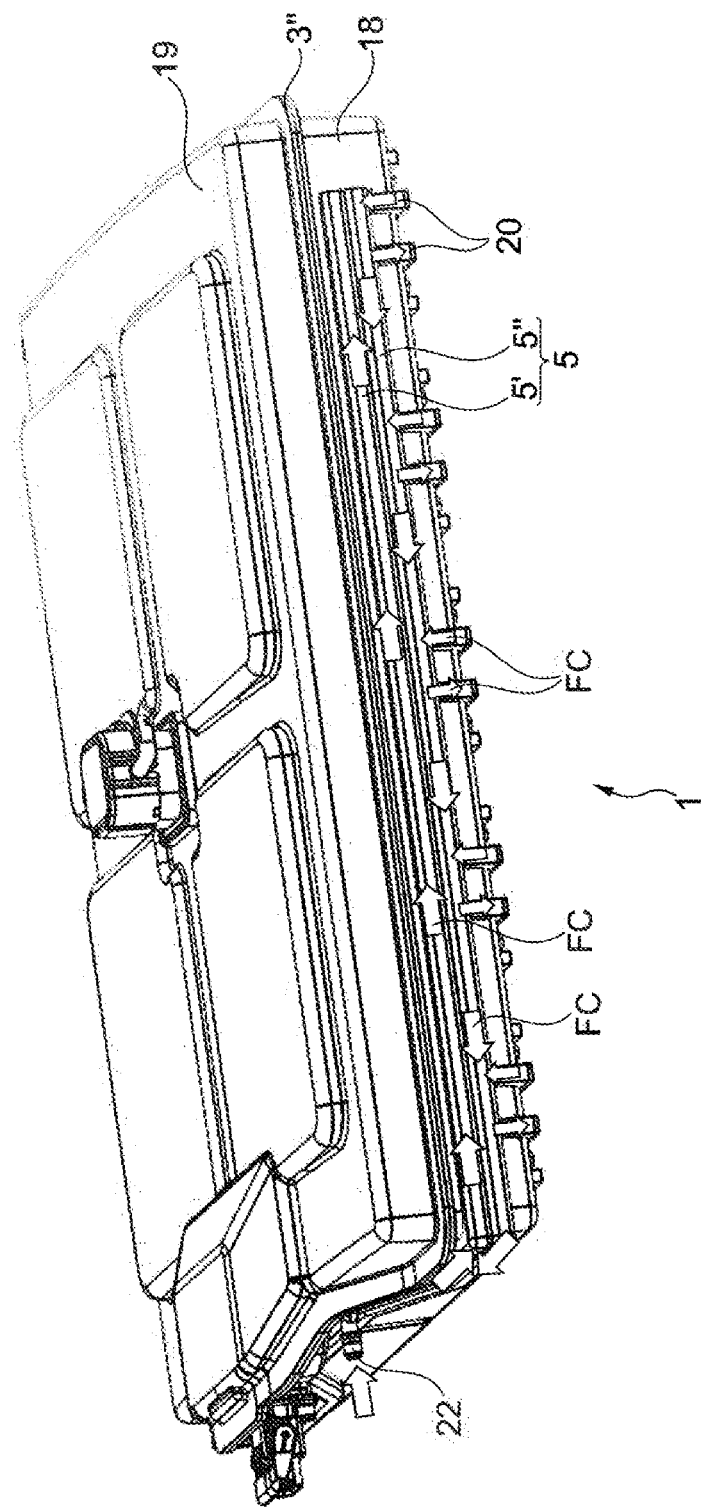
Figure 16:
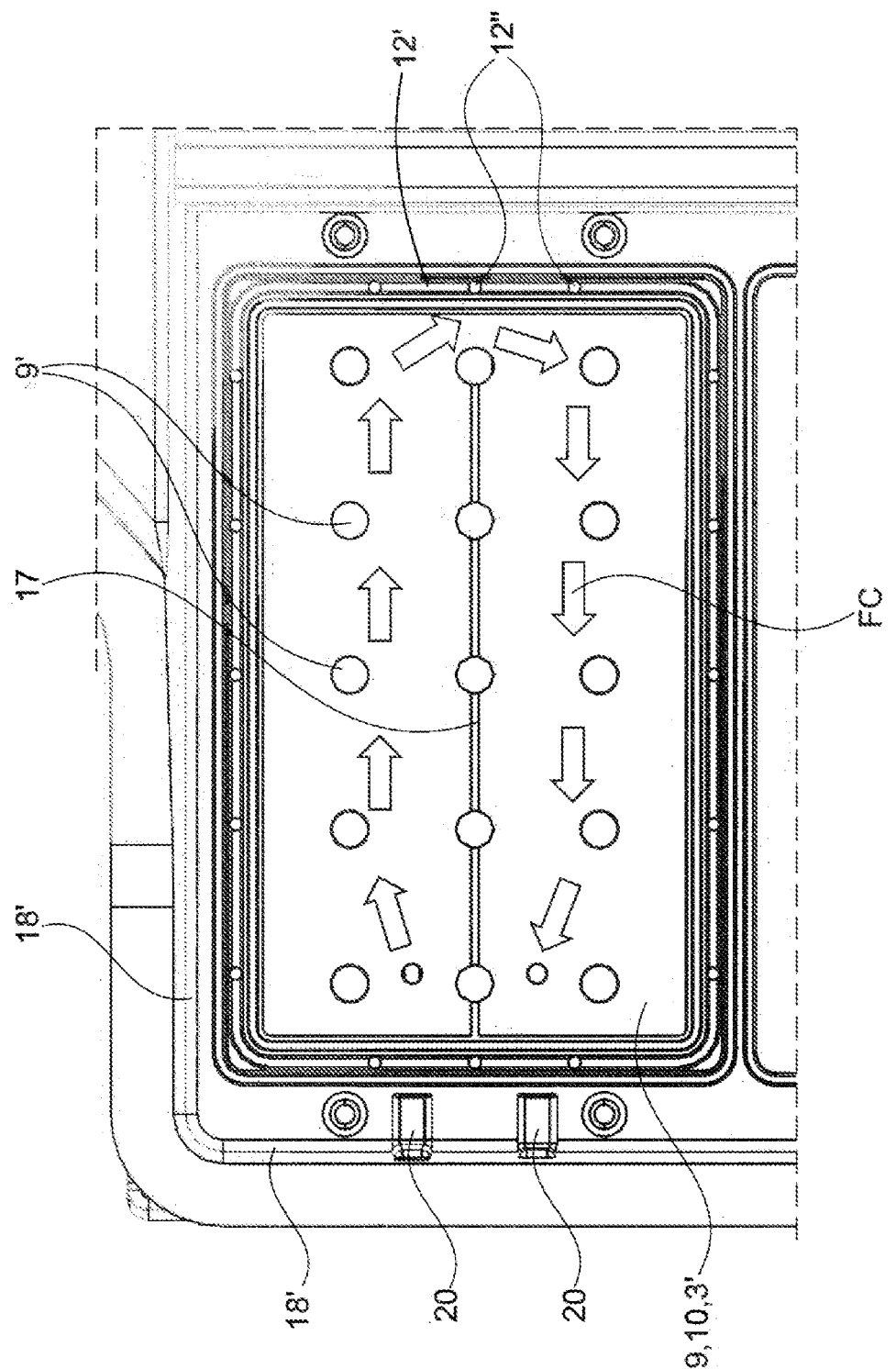
Figure 17:
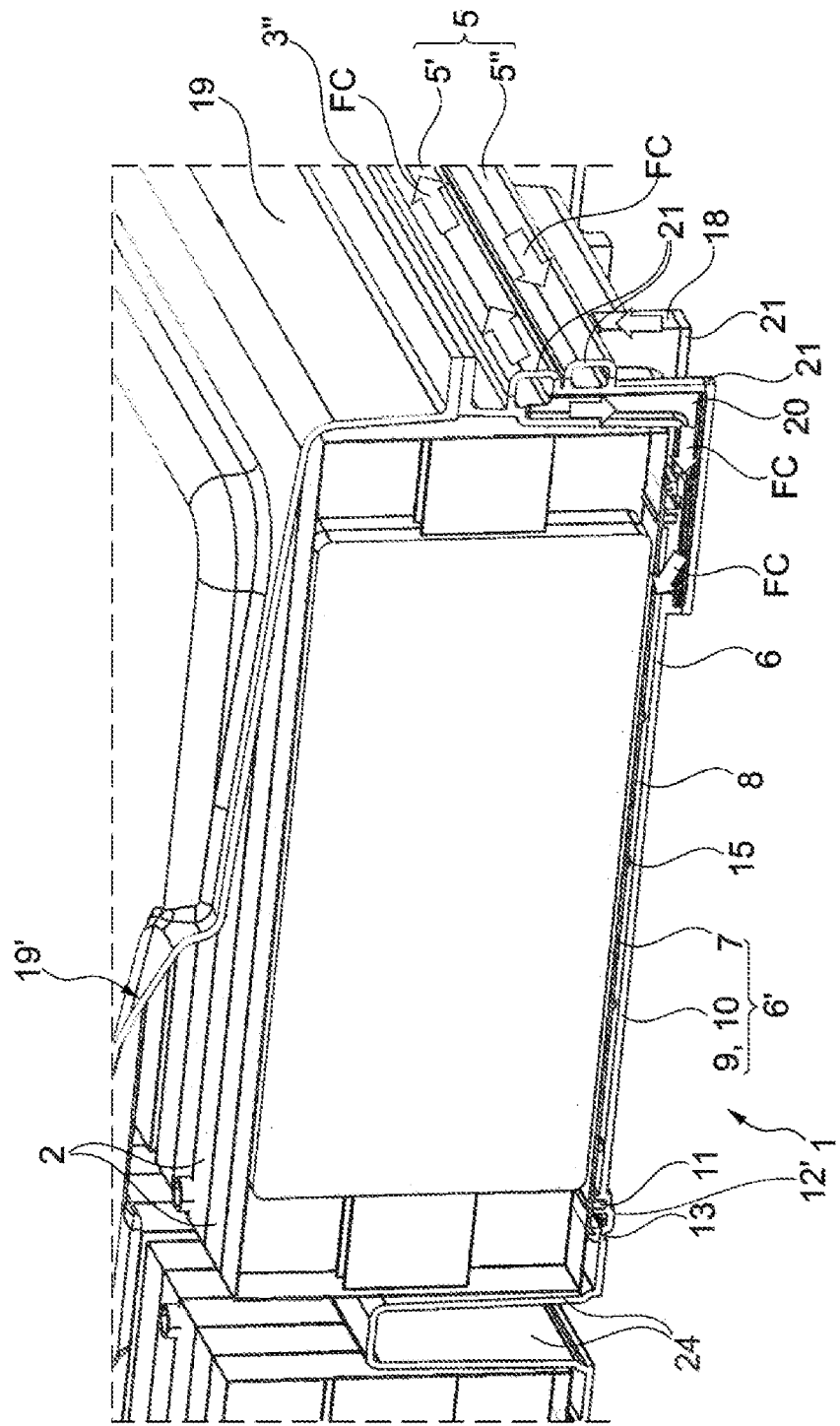
FIG. 17 is a partial view in transverse cross section (at right angles to the subdividing wall) of the battery unit represented in FIGS. 1A and 1B, illustrating the circulation of the heat-transfer fluid in the supply/discharge ducts, the tapping lines and the heat exchange zones.

As FIGS. 11 and 16 show, each heat exchange zone 6' comprises a volume 8 for circulation of heat-transfer fluid FC forming a portion of circuit in the form of a U-shaped or serpentine circuit, of which the two free ends of the two branches are fluidically linked to distribution/collection lines 5, 5" forming part of a circuit 5 for supplying/discharging heat-transfer fluid FC.

The U-shaped or serpentine circulation volumes 8 (not represented) are all fluidically linked:
  either individually in series and collectively to the circuit 5 (not represented);
  or individually and in parallel to this circuit 5 (FIGS. 8 to 11 and 17).

Preferably, and as is illustrated by way of example in FIGS. 4 to 6, 11 to 13, each surface element 7 with high thermal conductivity in the form of a plate is secured with the wall 3' of the housing 3, on the one hand, peripherally, preferably continually and for example by mechanical attachment or welded, and, on the other hand, in at least one bonding zone 15 situated inside the surface of said plate 7, advantageously in a plurality of bonding zones 15 distributed over the surface of said plate 7, preferentially regularly.

Thus, in addition to a peripheral fixing, the or each plate 7 is also rigidly secured at a plurality of points or scattered zones 15. The result thereof is a distributed fixing which avoids any deformation of the plate or plates 7 under the effect of the heat, and also under the effect of the weight of the cells 2 (for the plates 7 of the tray 18—the zones 15 also form bearing points—distribution of the stress), making it possible to ensure, over time, an optimal surface contact between plate(s) 7 and cells 2.

Figure 4:
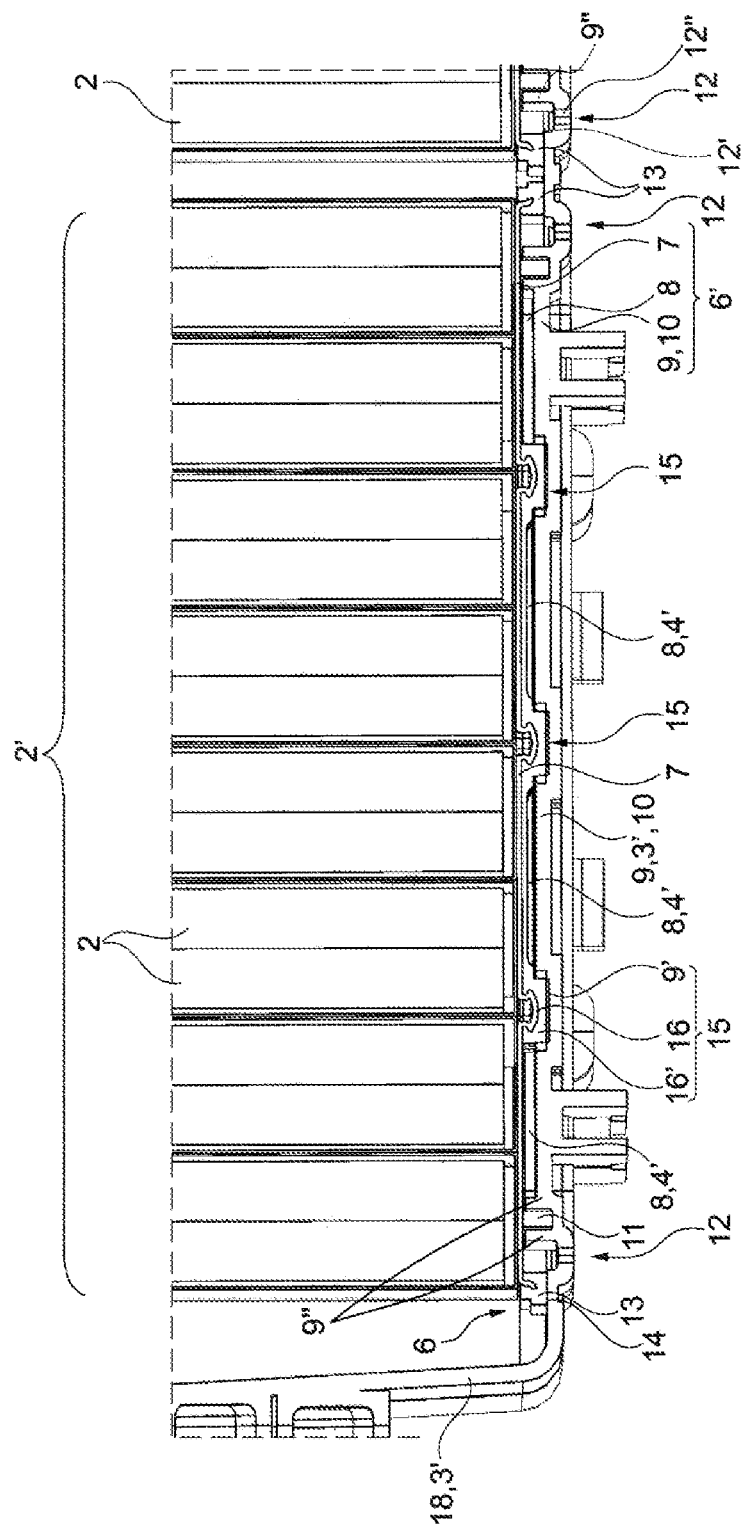
FIG. 4 is a representation of a part of the representation of FIG. 3 to a different scale.
Figure 5:
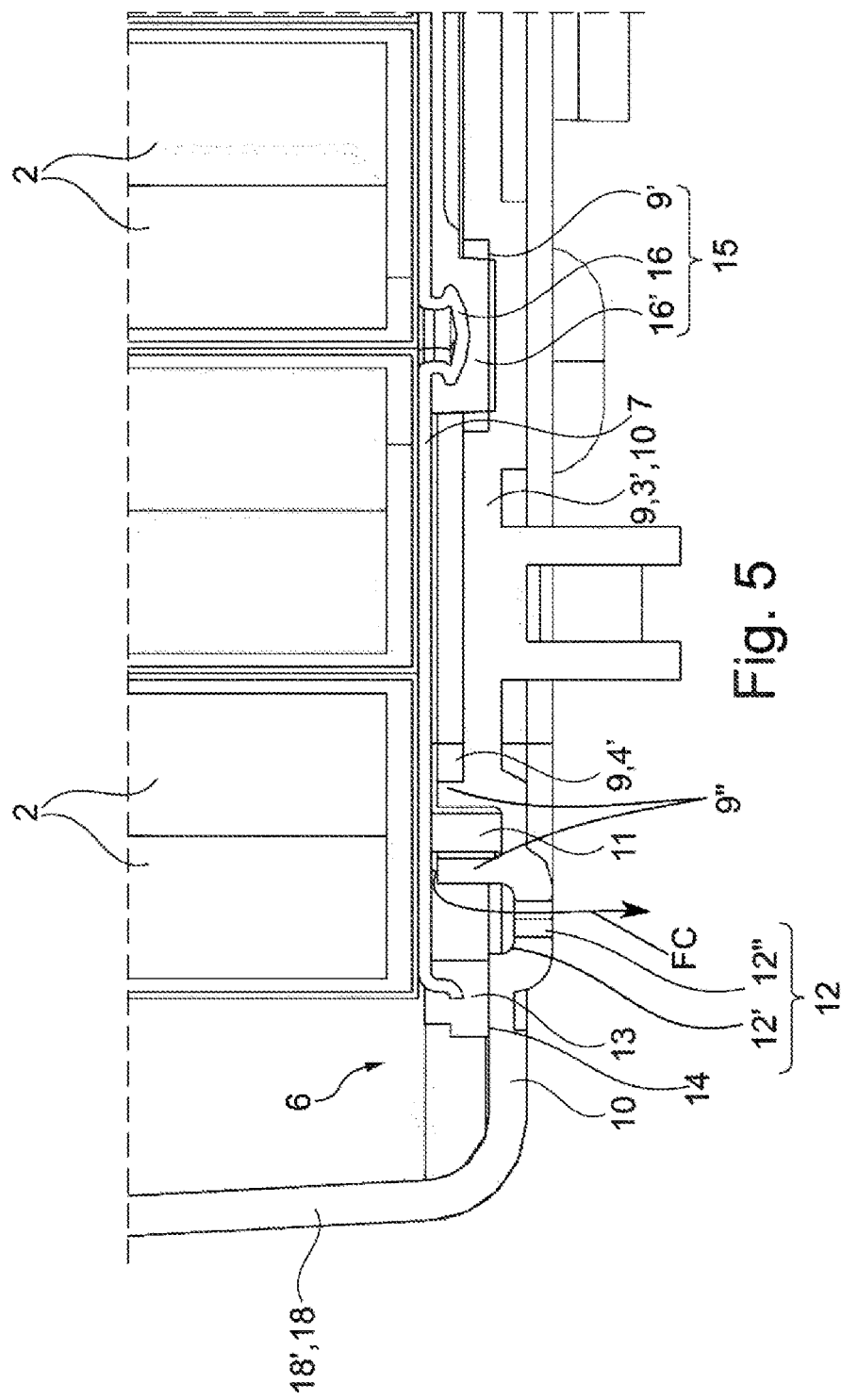
FIG. 5 is a representation of a part of the representation of FIG. 4 to a different scale, in the presence of a leak of heat-transfer liquid with discharge to the outside.

In accordance with an advantageous practical embodiment emerging from FIGS. 4 and 5 in particular, each surface element 7 with high thermal conductivity and in the form of a plate is secured with a portion of the wall 3' of the housing 3 forming a surface element 9 with low thermal conductivity, and is so secured in at least one bonding zone 15, preferentially a plurality of regularly distributed bonding zones 15. Each bonding zone 15 consists of a local deformation 16, protruding toward the portion of wall 3', of the surface element 7 in the form of a metal plate, said deformation 16 being overmolded by a material 16' compatible with the material of said portion of wall 3' for a bond by laser welding, for example.

These bond points 15 in the form of prominent local formations of plastic material 16' having a metal core 16 can, for example, come to be bearingly engaged in depressed local formations 9' formed in the portion of wall 3' forming the surface element 9, to provide as many spot mechanical bonds.

Despite the presence of possible strips of material between points 16' (devolving from the overmolding process), a circulation path for fluid FC in the exchange zone 6' concerned is formed between the two surface elements 7 and 9, in the volume 8 that they delimit between them.

Advantageously, provision can be made for one of the two facing surface elements 7 and 9, defining between them a volume 8 for circulation of heat-transfer fluid FC of a heat exchange zone 6', advantageously of rectangular form, to have a rib 17 subdividing said volume 8 into two branches of an elementary portion of a U-shaped, S-shaped or serpentine circulation circuit 4'.

Although this form of elementary circulation circuit 4' is preferred because of its production simplicity, large exchange surface area and circulation path suited to an easy circulation, other forms are also possible, such as serpentine, S-shaped, Z-shaped or the like.

As emerges also from FIGS. 1 to 3, 8 to 12 and 14 to 17, the temperature regulation means 4, 5 comprise distribution 5'/collection 5" ducts forming one or more circuits for supplying/discharging heat-transfer liquid LC, these ducts 5', 5" being structurally incorporated in the housing 3, and secondary or tapping lines 20 linking said ducts 5', 5" to the circulation volumes 8 of the heat exchange zones 6', these ducts 5', 5" and lines 20 being at least partially formed in one piece with the wall 3' of the housing 3.

The incorporation of the ducts 5', 5" and lines 20 can thus be performed at least partially in the production of the tray 18 and of the cover 19 and makes it possible to dispense with the provision and the tedious tight connection of ducts and hoses, while also avoiding the exposure of these means to the outside environment (distribution means attached against the wall 3').

Advantageously, the tubular walls of the ducts 5', 5" and of the lines 20 are formed, on the one hand, partially in and/or on the wall 3' of the housing 3, preferentially of generally substantially rectangular parallelepipedal form and, on the other hand, partially by the overmolded material 21 and/or portions of wall added and assembled by vibration or laser welding.

The distribution and the cutting of said tubular walls, between their parts formed by the wall 10', 18' of the tray 18 and their parts added by portions or by overmolding 21, depend on the possibilities of the mold for molding the tray 18 and on the configuration complexity of the tray 18 itself, and, if necessary, on the cover 19.

As FIG. 1 notably show, the or each supply/discharge circuit 5 comprises a connection end-fitting 22 for the distribution duct or ducts 5' and a connection end-fitting 22' for the collection duct or ducts 5", a common circuit 5 or separate circuits 5 being advantageously provided for the circulation volumes 8 of the heat exchange zones 6' present in the bottom tray 18 and the cover 19 which form the two constituent parts of the housing 3.

Figure 18:
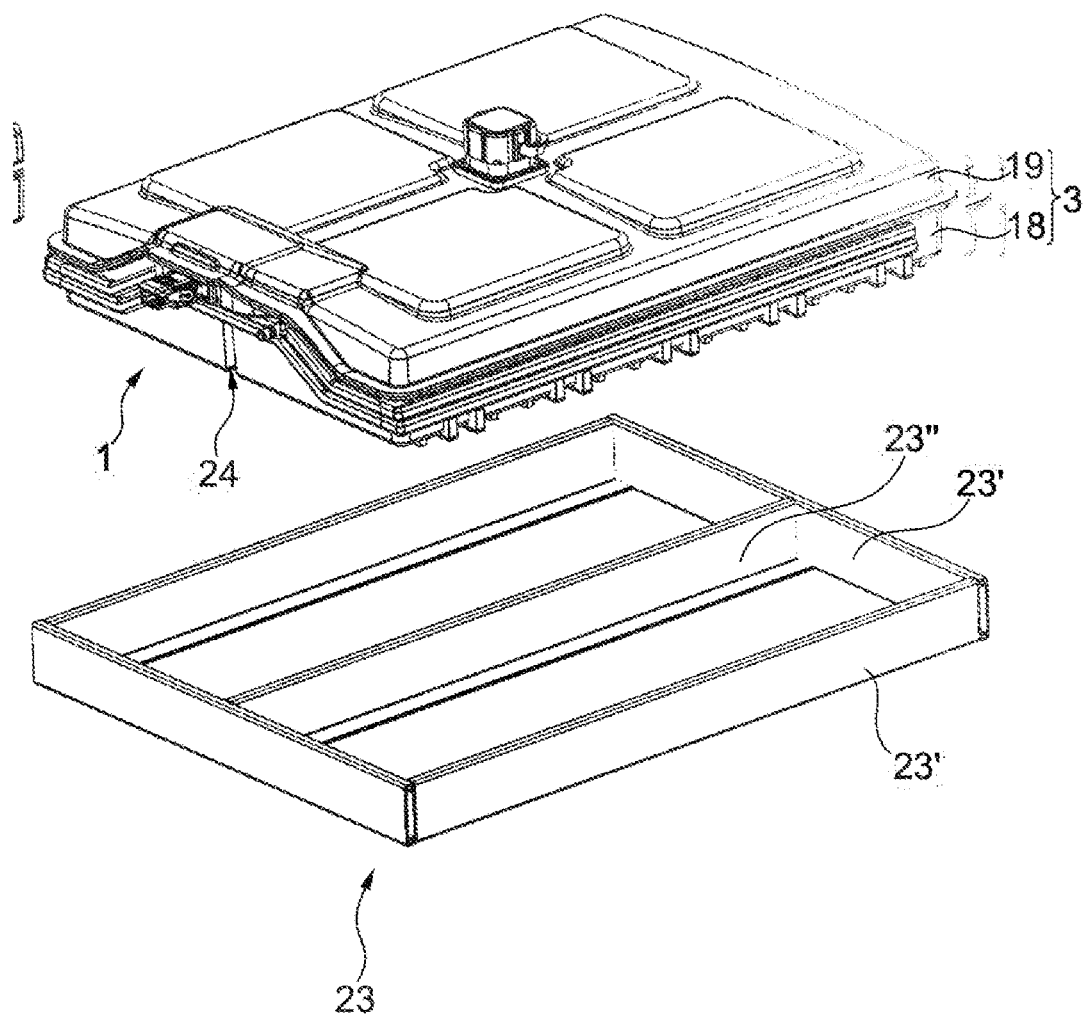
FIG. 18 is a view similar to FIG. 1A also showing a reinforcing frame intended to be fitted around and in the bottom tray of the housing of the battery unit.

In order to give the tray 18 an enhanced mechanical strength and rigidity, notably given the potentially significant weight of the cells 2, provision can be made for the tray 18 to comprise:
  a reinforcing structure incorporated in the body of the tray 18, for example overmolded by the thermoplastic material forming the wall of said tray 18, and/or
  a reinforcing structure 23 cooperating externally, by conjugation of forms, with the thermoplastic wall of said tray 18, for example of the frame type notably providing a median and peripheral stiffening of said tray 18 (FIG. 18). This frame 23 can comprise lateral walls 23' and a median spacer 23".

Furthermore, to structurally reinforce the bottom 10 of the tray 18 and possibly provide an additional wall surface for the formation of heat exchange zones 6', the tray 18 can also comprise at least one subdividing inner wall 24, extending in a single piece from the bottom of the tray 18, advantageously cooperating with a reinforcing structure 23 and incorporating, if necessary, volumes 8 for circulation of heat-transfer fluid FC, these volumes 8 preferentially forming part of the circulation means 4 of the tray 18 and fluidically linked to the distribution means 5 (FIGS. 7, 8, 11 and 17).

Said subdividing wall 24 can be a double wall subdividing the tray 6 into two sub-trays and providing a receiving groove for the spacer 23" of the reinforcing frame 23.

Figure 7B:
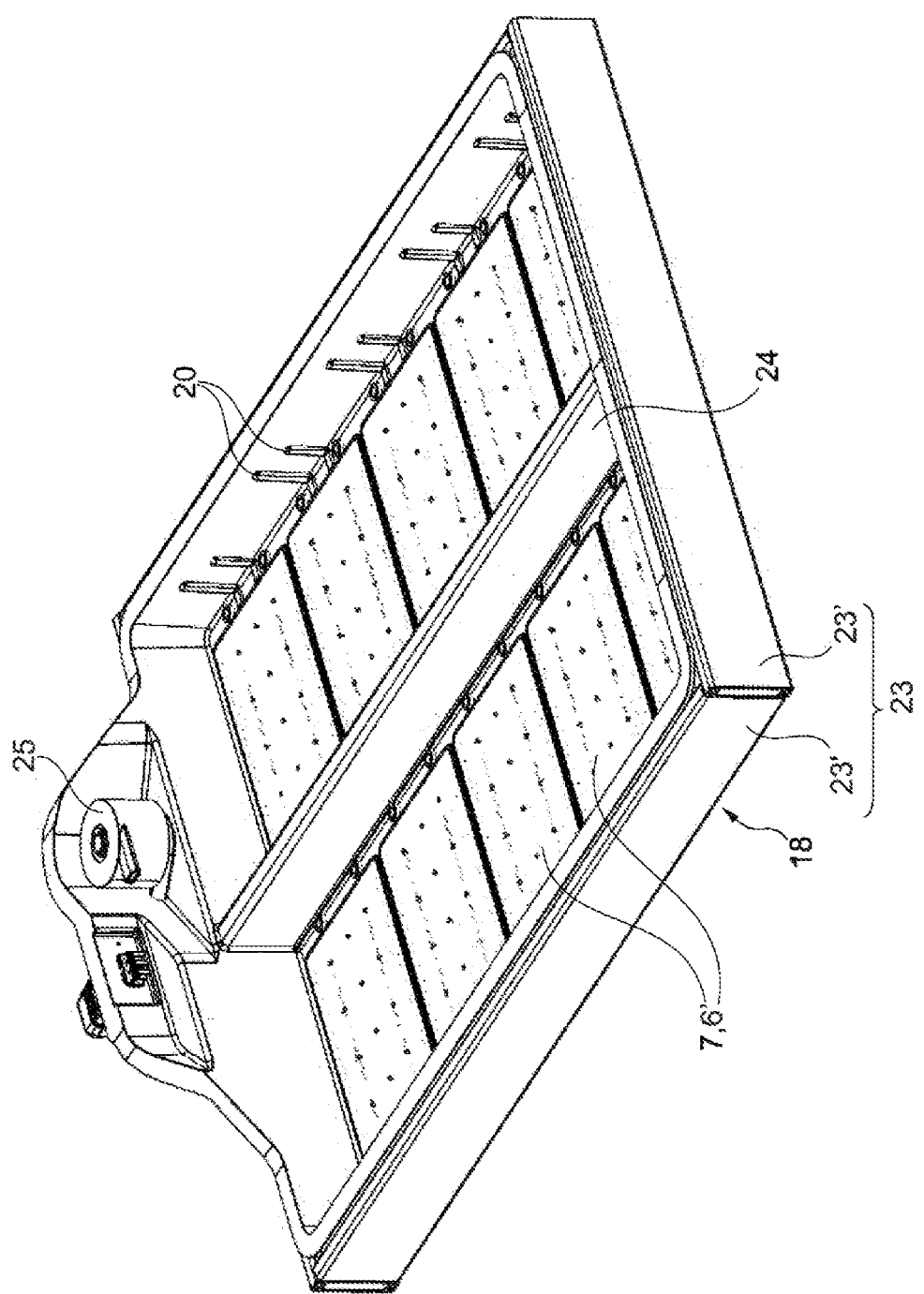
FIG. 7B is a view similar to that of FIG. 7A illustrating another variant embodiment of the tray, the cells being removed and a reinforcing frame being added on the tray.
Figure 9:
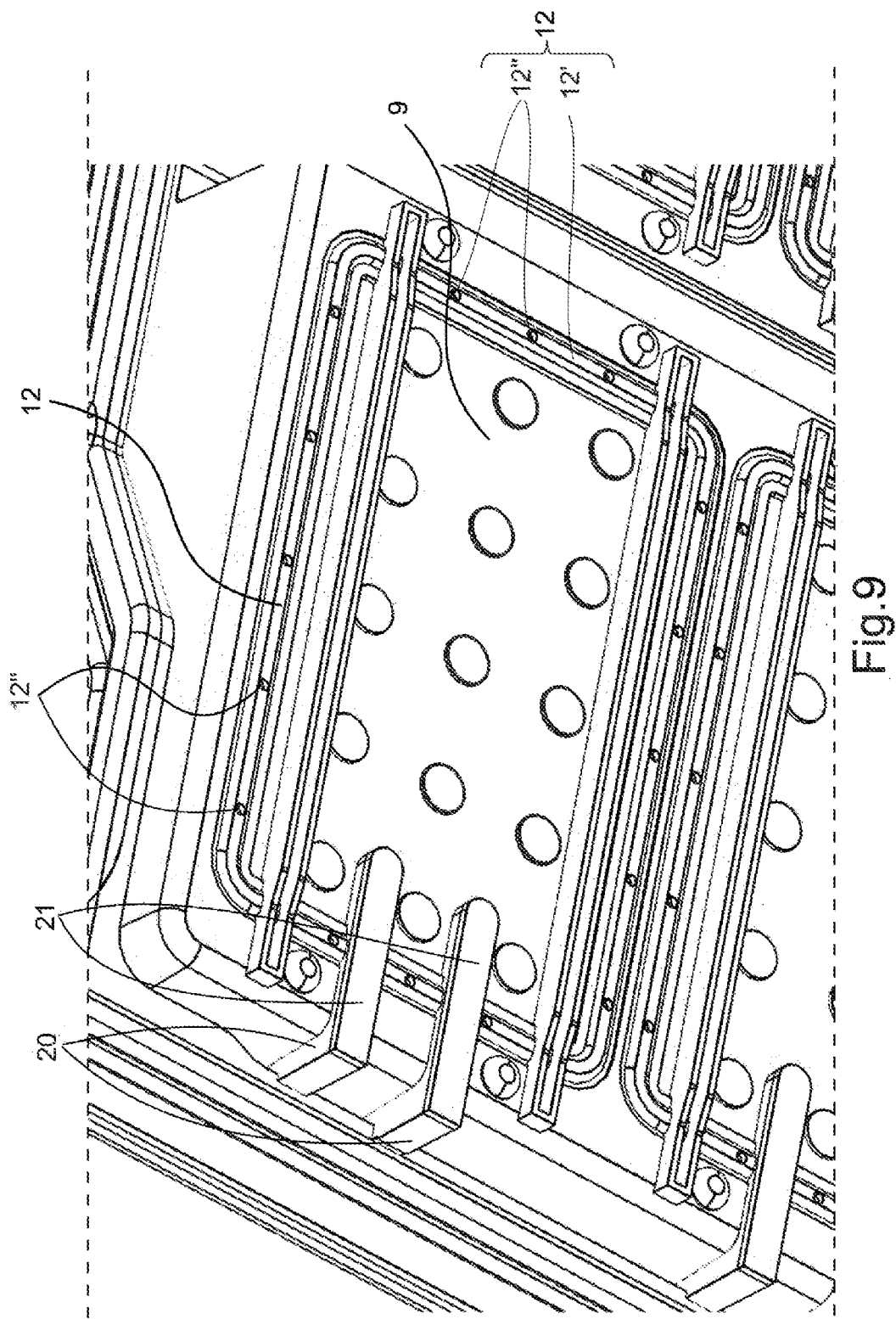
FIG. 9 is a detail view to a different scale of a part of the bottom tray represented in FIG. 8, corresponding substantially to a portion of bottom wall hollowed out forming a surface element with low thermal conductivity.
Figure 10:
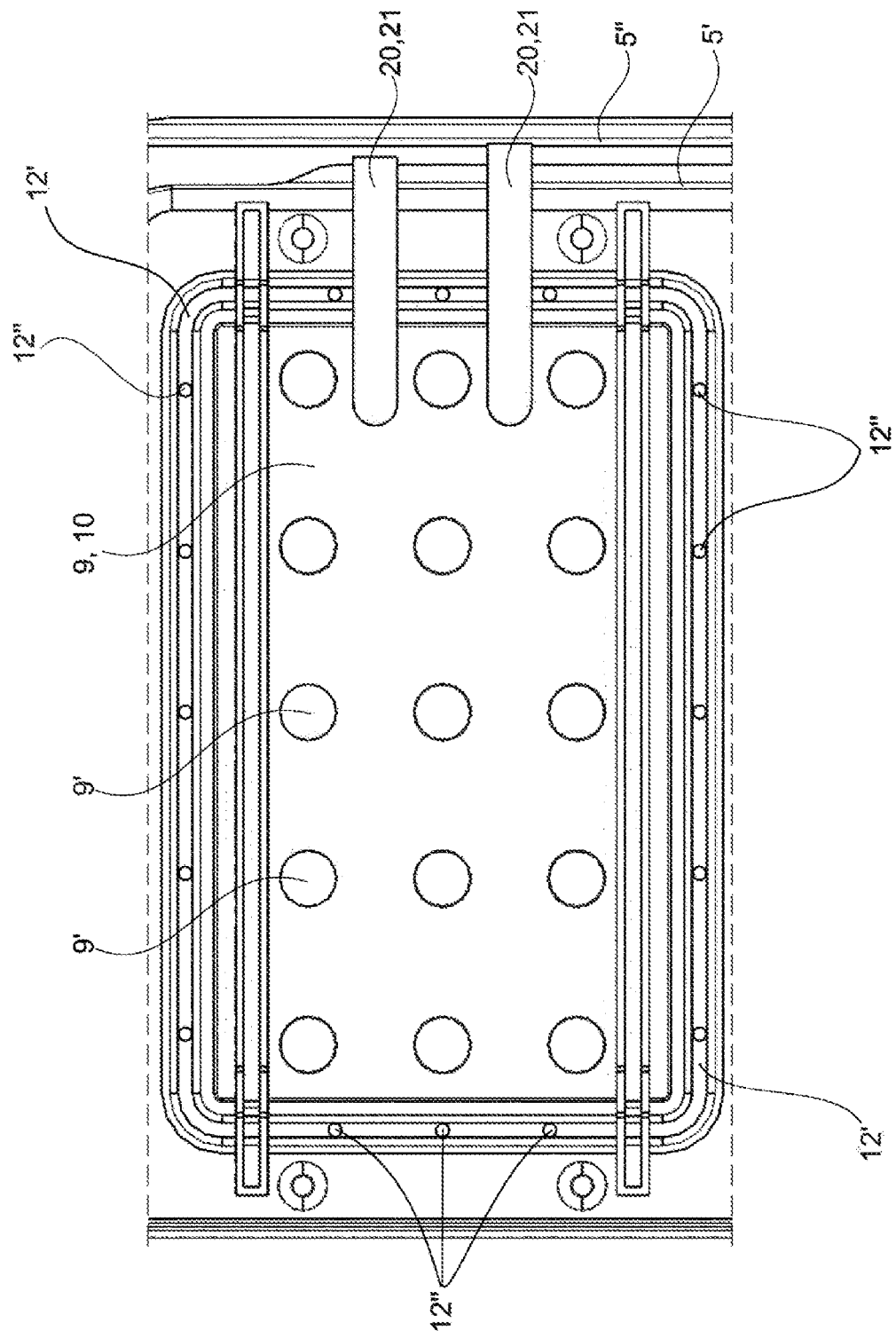
FIG. 10 is a view to a different scale of a detail of FIG. 9.

Moreover, a means 25 for controlling the temperature, the circulation and/or the distribution of the heat-transfer liquid is incorporated structurally, even materially, at least partly in the housing 3 (see FIG. 7B—partial incorporation of a water pump).

Finally, the invention relates also to a motor vehicle, in particular electric or hybrid, characterized in that it comprises at least one battery unit 1 as described above, this battery unit 1 also comprising at least one internal temperature measurement means, means for electrically connecting cells or elements 2 to one another and external connection means, the latter being advantageously partially formed with or in the wall 3',10 of the housing 3.

Of course, the invention is not limited to the embodiments described and represented in the attached drawings. Modifications can still be made, notably from the point of view of the construction of the various elements or by substituting technical equivalents, without in any way departing from the scope of protection of the invention.

The invention claimed is:

1. A battery unit for a hybrid and/or electric motor vehicle comprising:
   a plurality of cells or battery elements, physically and/or electrically grouped together in several blocks or modules and
   a housing accommodating and surrounding said cells or elements and, means for regulating the temperature of said cells or elements by circulation of a heat-transfer fluid, the housing having, at least in a bottom region on which the cells are arranged, at least one heat exchange zone between said cells and the heat-transfer fluid, said zone or zones being incorporated in the structure of said housing,
   the, or each, exchange zone comprising a surface element with high thermal conductivity in contact with cells, on one side, and the heat-transfer fluid, on its other side, and,
   the surface element with high thermal conductivity being an element added in the housing, and made of a material that is rigid and a good heat conductor, including metal, secured fluid-tightly with a surface element with low thermal conductivity, each surface element with low thermal conductivity of the or each exchange zone forming an integral part of the housing, optionally forming a portion of the wall thereof,
   wherein the or each exchange zone comprises a volume for circulation of heat-transfer fluid, defined between a surface element with high thermal conductivity, in direct contact with cells, and a surface element with low thermal conductivity, in contact with the outside environment, and made of a portion of the bottom wall of the housing, and in that the or each circulation volume is delimited laterally or peripherally by a sealing means arranged between the two elements considered, a leak path being formed around the surface element concerned, allowing the outward discharge of any heat-transfer liquid leaking if necessary from the targeted volume in case of damage.

2. The battery unit as claimed in claim 1, wherein the or each leak path is formed in the bottom wall of the housing and extends continually around the peripheral sealing means of the circulation volume concerned, which preferentially corresponds to a flat and planar chamber.

3. The battery unit as claimed in claim 1, wherein the or each leak path comprises a groove or score formed in the bottom wall and which extends externally and circumferentially around the peripheral sealing means of the circulation volume considered, advantageously closely following the outline of said means, and in that at least one, preferentially several, orifices passing through the bottom wall of the housing is/are formed in the bottom of said groove.

4. The battery unit as claimed in claim 1, wherein each surface element with high thermal conductivity and in the form of a plate comprises an edge forming a peripheral frame, in a single piece or added by overmolding, secured with the bottom wall of the housing, the portion of bottom wall facing the surface element forming a surface element with low thermal conductivity and a securing zone between the frame and the bottom wall, for example a weld link zone, extending around and at a distance from the peripheral sealing means of the circulation volume concerned.

5. The battery unit as claimed in claim 4, wherein the leak path of each exchange zone extends between the securing zone and the peripheral sealing means.

6. The battery unit as claimed in claim 1, wherein at least some or all of the leak paths of different heat exchange zones converge toward a zone or a single point of the bottom wall of the housing, provided with a discharge orifice.

7. The battery unit as claimed in claim 6, wherein the zone or the point of convergence of the flows originating from several or all of the leak paths is equipped with a detector of the presence of heat-transfer liquid.

8. The battery unit as claimed in claim 1, wherein the sealing means consists of a seal present, in the compressed state, between the mutually secured peripheral edges of the two surface elements, this seal being preferentially housed in a groove of the bottom wall.

9. The battery unit as claimed in claim 1, wherein each surface element corresponds to a depressed zone or a depression of the bottom wall of the housing, delimited laterally by raised edges on which a surface element in the form of a thermally conductive plate is arranged, with the interposition of a sealing means.

10. The battery unit as claimed in claim 1, wherein each surface element with high thermal conductivity in the form of a plate is secured with the bottom wall of the housing, on the one hand, peripherally in a securing zone, by a continuous weld, and, on the other hand, in at least one bonding zone situated inside the surface of said plate, advantageously in a plurality of bonding zones distributed over the surface of said plate, preferably regularly.

11. The battery unit as claimed in claim 1, wherein each surface element with high thermal conductivity and in the form of a plate is secured with a portion of the bottom wall of the housing forming the surface element with low thermal conductivity, and is so secured in at least one bonding zone, each bonding zone having a local deformation, protruding toward the portion of wall, of the surface element in the form of a metal plate, said deformation being overmolded by a material capable of being laser welded to the material of said portion of bottom wall.

12. The battery unit as claimed in claim 11, wherein one of two surface elements facing one another, defining between them a circulation volume for heat-transfer fluid of a heat exchange zone of rectangular form and flat, said circulation volume having a rib subdividing said volume into two branches of an elementary portion of a U-shaped, S-shaped or serpentine circulation circuit.

13. The battery unit as claimed in claim 1, wherein the circulation volumes of different heat exchange zone or zones form portions of one or several circuits for circulation of heat-transfer fluid, incorporated in the structure of the housing, said portions of circuit being fluidically linked in series, or not, and connected to distribution/collection ducts forming part of a circuit for supplying/discharging heat-transfer fluid liquid, these circuits forming the means for regulating the temperature of the cells.

14. The battery unit as claimed in claim 1, wherein the housing is made of a plastic material and comprises a bottom tray, with a bottom wall, and a top cover assembled peripherally to one another, preferentially by screwing, and possibly with the interposition of a seal, in a contact strip.

15. The battery unit as claimed in claim 14, wherein the cover also incorporates, in its structure, one or more heat exchange zones between at least some, of the cells and the heat-transfer fluid, the or each heat exchange zone of the cover comprising a volume for circulation of heat-transfer fluid and being formed by the cooperation of a formation or depression of the wall of the cover, forming the surface element with low thermal conductivity, with the surface element with high thermal conductivity, in the form of a plate and in contact with at least some of the cells of a module.

16. The battery unit as claimed in claim 14, wherein a flexible and thermally conductive plate or leaf is inserted between the surface element or elements with high thermal conductivity of the heat exchange zone, or zones incorporated in the cover and/or the bottom of the tray, on one side, and the faces of one of the cells of the modules, on its other side.

17. The battery unit as claimed in claim 1, wherein each heat exchange zone comprises a volume for circulation of heat-transfer fluid forming a portion of a U-shaped or serpentine circuit, in which two free ends of two branches are fluidically linked to distribution/collection lines forming part of a circuit for supplying/discharging heat-transfer fluid.

18. The battery unit as claimed in claim 1, wherein the temperature regulation means comprise distribution/collection ducts forming one or more circuits for supplying/discharging heat-transfer fluid, these ducts being structurally incorporated in the housing, and secondary or tapping lines linking said ducts to the circulation volumes of the heat exchange zones, these ducts and lines being at least partially formed in a single piece with the wall of the housing.

19. The battery unit as claimed in claim 18, wherein the tubular walls of the ducts and of the lines are formed, on the one hand, partially in and/or on the wall of the housing, preferentially of generally substantially rectangular parallelepipedal form, and, on the other hand, partially by the overmolded material and/or portions of wall attached and assembled by vibration or laser welding.

20. The battery unit as claimed in claim 18, wherein the or each supply/discharge circuit comprises a connection end-fitting for the distribution duct or ducts and a connection end-fitting for the collection duct or ducts, a common circuit or separate circuits being advantageously provided for the circulation volumes of the heat exchange zones.

21. The battery unit as claimed in claim 18, wherein the bottom tray comprises a reinforcing structure incorporated in the body of the tray, overmolded by the thermoplastic material forming the wall of said tray.

22. The battery unit as claimed in claim 18, wherein the tray comprises a reinforcing structure cooperating externally, by conjugation of forms, with the thermoplastic wall of the bottom tray, for example of frame type notably providing a median and peripheral stiffening of said tray.

23. The battery unit as claimed in claim 18, wherein the bottom tray comprises at least one subdividing inner wall, extending in a single piece from the bottom of the tray, cooperating advantageously with a reinforcing structure and incorporating volumes for circulation of heat-transfer fluid, these volumes forming part of the circulation means of the tray and fluidically linked to the distribution means.

24. The battery unit as claimed in claim 1, wherein a means for controlling the temperature, the circulation and/or the distribution of the heat-transfer liquid is incorporated structurally, even physically, at least partly in the housing.

25. A motor vehicle, in particular electric or hybrid, wherein said motor vehicle comprises at least one battery unit as claimed in claim 1, this battery unit also comprising at least one internal temperature measurement means, means for electrically connecting cells or elements to one another and external connection means, the latter being advantageously partially formed with or in the wall of the housing.

\* \* \* \* \*